US011681431B2

(12) United States Patent
Okamoto

(10) Patent No.: US 11,681,431 B2
(45) Date of Patent: Jun. 20, 2023

(54) METHODS AND SYSTEMS FOR DYNAMICALLY ADJUSTING VEHICLE HUMAN MACHINE INTERFACE TO USER PREFERENCE

(71) Applicant: SUBARU CORPORATION, Tokyo (JP)

(72) Inventor: Yohei Okamoto, VanBuren Township, MI (US)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/412,713

(22) Filed: Aug. 26, 2021

(65) Prior Publication Data
US 2023/0062004 A1    Mar. 2, 2023

(51) Int. Cl.
*G06F 3/0488* (2022.01)
*G06F 3/04883* (2022.01)
*H04W 4/029* (2018.01)
*H04W 4/44* (2018.01)
*G06V 10/94* (2022.01)
*G06V 20/59* (2022.01)
*H04M 1/72451* (2021.01)

(52) U.S. Cl.
CPC .......... *G06F 3/04883* (2013.01); *G06V 10/95* (2022.01); *G06V 20/597* (2022.01); *H04W 4/029* (2018.02); *H04W 4/44* (2018.02); *H04M 1/72451* (2021.01)

(58) Field of Classification Search
CPC ..... G06F 3/04883; H04W 4/44; H04W 4/029; G06V 20/597; G06V 10/95; H04M 1/72451; B60K 35/00
See application file for complete search history.

(56) References Cited

U.S. PATENT DOCUMENTS

| 2009/0247151 A1 | 10/2009 | Kameyama |
| 2013/0111403 A1 | 5/2013 | Nakamura |
| 2020/0257364 A1* | 8/2020 | Strandberg ............. B60K 35/00 |

FOREIGN PATENT DOCUMENTS

| JP | 11-311545 A | 11/1999 |
| JP | 2004-102332 A | 4/2004 |
| JP | 2008-030674 A | 2/2008 |
| JP | 2009-232415 A | 10/2009 |
| JP | 2009-294899 A | 12/2009 |

(Continued)

*Primary Examiner* — Abdul-Samad A Adediran
(74) *Attorney, Agent, or Firm* — McDermott Will & Emery LLP

(57) ABSTRACT

Aspects of the subject technology relate to a technique automatically adapting a vehicle HMI to a user preference. The HMI includes a touchscreen displaying selectable icons associated with functions. Every time the HMI detects a selection of a first icon by a user among the icons, the HMI sends to the server, first information on a first function associated with the first icon, when the first icon is selected, and where the HMI is located when the first icon is selected. The server analyzes the first information to recognize a pattern of behavior taken by the user in selecting the first icon, generating a first user preference. The HMI updates an arrangement of the icons on the touchscreen based on the first user preference. The first user preference includes parameters that includes a certain day of a week, a certain time of that day, and a location.

16 Claims, 18 Drawing Sheets

(56) References Cited

FOREIGN PATENT DOCUMENTS

| | | |
|---|---|---|
| JP | 2011-195084 A | 10/2011 |
| JP | 2013-096736 A | 5/2013 |
| JP | 2018-020732 A | 2/2018 |

\* cited by examiner

Table 1: Smartphone 14

| Selected Icon | Weather Application | Home Lighting System (light ON) | Video Streaming | Video Streaming | Food Delivery (selected) | Game (selected) |
|---|---|---|---|---|---|---|
| Timestamp | Thursday, 04/08/2021, 07:00AM | Thursday, 04/08/2021, 06:38PM | Thursday, 04/08/2021, 09:16PM | Saturday, 04/10/2021, 08:08PM | Sunday, 04/11/2021, 11:11AM | Sunday, 04/11/2021, 01:10PM |
| Location | Home | Home | Home | Home | Home | Home |
| Weather | Cloudy, 38°F | Clear, 47°F | Clear, 44°F | Cloudy, 42°F | Rain, 52°F | Rain, 53°F |

Table 2: Vehicle HMI 12

| Selected Icon | Seat Heater (ON) | Idling Stop-Start Off (Selected) | Garage Opener (Selected) | Radio (FM95.5) | Navigation (Ukai Restaurant) | Navigation (Home) | Garage Opener (Selected) |
|---|---|---|---|---|---|---|---|
| Timestamp | Thursday, 04/08/2021, 08:00AM | Thursday, 04/08/2021, 08:03AM | Thursday, 04/08/2021, 08:04AM | Thursday, 04/08/2021, 08:04AM | Thursday, 04/08/2021, 12:05PM | Thursday, 04/08/2021, 06:07PM | Thursday, 04/08/2021, 06:37AM |
| Location | Home | Home | Home | Home | Work | Work | Home |
| Weather | Cloudy, 40°F | Cloudy, 40°F | Cloudy, 40°F | Cloudy, 40°F | Sunny, 62°F | Clear, 51°F | Clear, 47°F |

Table 3: Home Network System 18

| Launched System | Home Security (Remote Camera: ON) | Vacuum (ON) |
|---|---|---|
| Timestamp | Thursday, 04/08/2021, 10:22PM | Saturday, 04/10/2021, 09:18AM |
| Location | Home | Home |
| Weather | Clear, 44°F | Sunny, 51°F |

FIG. 7

User Preference Table — 900

| User Activity | Part of the Day | Weekdays/Weekend | Location | Temperature | Number of Occurrences |
|---|---|---|---|---|---|
| Seat heater (ON) | Morning | Weekdays | Home | 38-40°F | Morning-2 |
| Idling Stop-Start Off (Selected) | Morning, Midday, Evening | Weekdays | Home, Work | 38-71°F | Morning-18 Midday-6 Evening-15 |
| Garage Opener (Selected) | Morning, Evening | Weekdays Weekend | Home | 38-63°F | Morning-24 Evening-24 |
| Radio (FM95.5) | Morning | Weekdays | Home | 38-50°F | Morning-12 |
| Navigation (Ukai Restaurant) | Midday | Weekdays | Work | 51-71°F | Midday-4 |
| Navigation (Home) | Evening | Weekdays | Work | 43-56°F | Evening-21 |
| Weather Application | Morning | Weekdays | Home | 38-50°F | Morning-21 |
| Home Lighting System (light ON) | Evening | Weekdays | Home | 47-58°F | Evening-21 |
| Video Streaming | Evening | Weekend | Home | 43-61°F | Evening-5 |
| Food Delivery (selected) | Midday | Weekend | Home | 48-67°F | Midday-3 |
| Game (selected) | Midday | Weekend | Home | 51-75°F | Midday-4 |
| Vacuum (ON) | Morning | Weekend | Home | 42-51°F | Morning-5 |
| Home Security (Remote Camera: ON) | Night | Weekdays Weekend | Home | 44-57°F | Night-31 |

FIG. 9

METHODS AND SYSTEMS FOR DYNAMICALLY ADJUSTING VEHICLE HUMAN MACHINE INTERFACE TO USER PREFERENCE

BACKGROUND

Field

The present disclosure generally relates to a vehicle human machine interface (HMI), and more particularly to methods and systems for dynamically adjusting a vehicle HMI to a user preference.

Description of the Related Art

Redesigned models of vehicles are released every several years. The redesigned models often have engines, transmissions, suspensions, safety systems, and interior designs that are redesigned to provide different driving experiences in addition to updated appearances that differ from the previous models.

Redesigning interior designs of a vehicle includes redesigning a vehicle HMI provided in the dashboard of the vehicle. The vehicle HMI is an interface that allows humans to interact with various systems of the vehicle. For example, the vehicle HMI includes a touchscreen displaying selectable icons. Those selectable icons may be associated with functions to be performed by the vehicle in response to user selection of the icons. Over the years, vehicle HMIs have become more multifunctional, providing more functionalities for users. To accommodate the added functionalities provided through the vehicle HMI, the developers of vehicle HMIs need to update the layout of the vehicle HMIs. Thus, the vehicle HMIs are generally updated when the vehicle is redesigned. The updated vehicle HMI provides the users with a new HMI layout and HMI functions and requires the users to learn and adapt to the updated vehicle HMI which is burdensome for the users.

The description provided in the background section should not be assumed to be prior art merely because it is mentioned in or associated with the background section. The background section may include information that describes one or more aspects of the subject technology.

SUMMARY

The disclosed subject matter relates to method and system for dynamically adjusting a vehicle HMI to a user preference.

In accordance with various aspects of the subject disclosure, a method and system for automatically adapting an HMI to a user preference is provided. The HMI includes a touchscreen displaying selectable icons associated with functions to be performed in response to selection of the icons, and the HMI is configured to be communicable with a server. The HMI detects a selection of a first icon by a user among the icons on the touchscreen, and sends to the server, first information on (1) a first function associated with the first icon selected, (2) when the first icon is selected, and (3) where the HMI is located when the first icon is selected. The server stores the first information in a storage, analyzes the first information to recognize a pattern of behavior taken by the user in selecting the first icon, generates a first user preference based on the recognized pattern, and saving the first user preference in a storage. The HMI updates an arrangement of the icons on the touchscreen based on the first user preference from the server. The analyzing of the first information includes determining a correlation of the first function with (1) a certain day of a week, (2) a certain time of that day, and (3) a location.

It is understood that other configurations of the subject technology will become readily apparent to those skilled in the art from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings:

FIG. 7 is exemplary data tables stored in user information area of the server according to example aspects of the present disclosure;

FIG. 9 is an exemplary data table stored in a user preference area of the server according to example aspects of the present disclosure;

Figure 1:
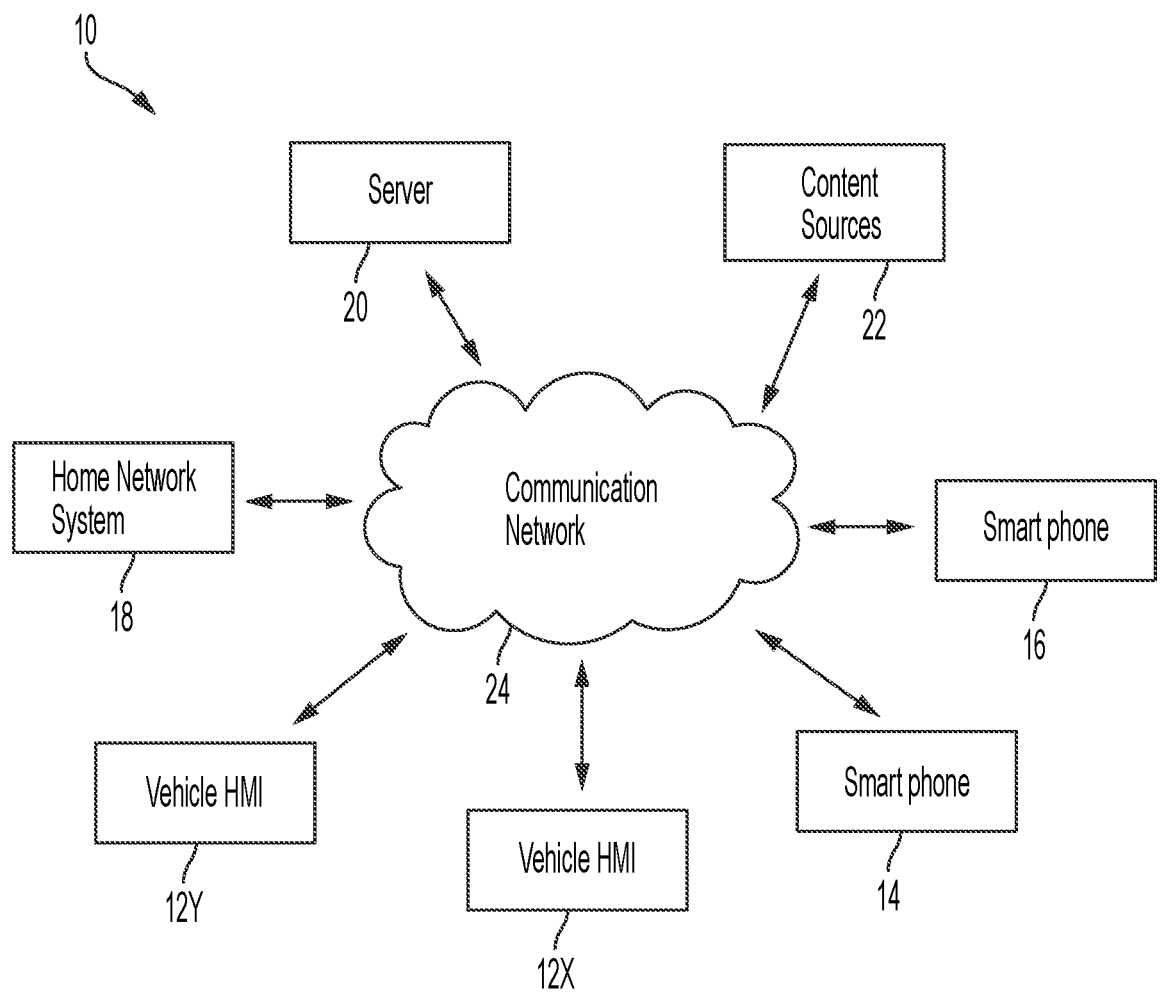
FIG. 1 is a diagram showing an exemplary network system according example aspects of the present disclosure.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description may include specific details for the purpose of providing a thorough understanding of the subject technology. However, the subject technology is not limited to the specific details set forth herein and may be practiced without these specific details. In some instances, structures and components are shown in block diagram form in order to avoid obscuring the concepts of the subject technology.

1. Overview

A vehicle HMI may be an interface, such as a touchscreen, displaying selectable icons associated with functions to be performed by various system in a vehicle in response to user selection of the icons. For example, the vehicle HMI may provide an interface for setting vehicle functionalities such as idling stop-start settings and air conditioner settings. The vehicle HMI may also provide interface for an in-car infotainment system including audio systems, navigation systems, video players, USB, Bluetooth connectivity, and Wi-Fi.

As new technologies, such as audio systems and navigation systems, were introduced in vehicles, vehicle HMIs became more important part of the vehicle to allow users to interact with various systems in the vehicle. Even within the audio systems and the navigation systems, new technologies are continuously introduced and added. For example, with personal mobile devices (e.g., smartphones) gaining more users, smartphone functions were recently added to the in-car infotainment system.

To keep up with the ever-changing technology, redesigned models of vehicles generally introduce updates to vehicle HMIs. The updates to the vehicle HMIs may include, for example, introducing new icons for added functions, new icon designs, and a new icon layout for the vehicle HMIs. In some other examples, the updates of the vehicle HMIs may include a newly designed vehicle HMI that has little or no resemblance of the previous vehicle HMI. These updates, thus, create burden for users as the users are required to learn and familiarize themselves with the newly designed vehicle HMIs.

For example, a user purchases a redesigned model of the vehicle the user previously drove. Since the newly purchased redesigned model is merely a newer version of the vehicle the user previously drove, the user expects the vehicle HMI installed on the newly purchased redesigned model to be similar to the vehicle HMI that was installed on the previous vehicle. The vehicle HMI on the redesigned model, however, may have been newly designed to accommodate the ever-changing technologies. This may cause the user to unexpectedly learn and familiarize him/herself with the vehicle HMI of the redesigned model.

Even when the vehicle HMI of the redesigned model had new functions added without a major change in the design of the vehicle HMI, it is sometimes not obvious to the user what functions were added and how the added new functions will impact the user. For example, the user may, like many other users, now wish to take the time to read the user manual or sit through the tutorial for the vehicle HMI of the redesigned vehicle. This type of users tend to learn and familiarize themselves only with the minimum functions of the vehicle HMI that the user deems necessary, or in an extreme case, these users may give up on using the vehicle HMI.

In another example, the user may wish to modify the user interface of the vehicle HMI for better usability. For example, the user of the vehicle may frequently selects an idling stop-start off icon provided on the user interface (i.e., display) of the vehicle HMI to turn off an idling stop function so that the vehicle does not automatically switch the engine off at traffic lights. However, if there are a number of steps the user has to take before making the idling stop-start off icon appear on the display of the vehicle HMI when selecting the idling stop-start off icon, the user may wish to move the idling stop-start icon on the main page of the display to improve usability. Some vehicle HMIs prohibit customizations of the vehicle HMIs, and thus, the user has to endure the burden every time the user selects and enjoy the functionality provided by the idling stop-start off icon. Some other vehicle HMIs may permit customizations of the vehicle HMIs, but how to move the frequently used icons to the main page or save to the user's favorite list in the vehicle HMI may not be obvious or intuitive to the user. As many users do not read the user manual or sit through the tutorial, the user may choose to opt-in for enduring the burden of taking multiple steps to select the idle stop-start off icon.

To address the problems, the present disclosure provides solutions of dynamically adjusting a vehicle HMI to a user preference based on usage patterns of one or more selectable icons provided for display by the vehicle HMI. When a user selects an icon displayed on a user interface of the vehicle HMI, the information associated with the selected icon is analyzed to determine the usage pattern of the selected icon. The information associated with the selected icon may include (1) a function associated with the selected icon, (2) a timestamp of when the icon is selected, and (3) a location of where the HMI is located when the icon is selected. Upon determining the usage pattern, a user preferred icon arrangement is generated based on the determined usage pattern, and the selected icon is provided for display on the user interface of the vehicle HMI according to the generated user preferred icon arrangement. This configuration allows the vehicle HMI to provide for displaying the frequently used icons at positions (e.g., main page of the user interface of the vehicle HMI) that are easily accessible by the user. Even if the user's preferences change, the configuration allows the vehicle HMI to provide the user with an updated user interface that matches the user's new preferences.

To further address the problems, the user preferred icon arrangement may be generated based further on usage patterns of the user's smartphone, tablet, and smart appliances. This configuration allows the vehicle HMI to provide certain icons at easily accessible by the user while providing certain icons seamlessly across different user devices.

To furthermore address the problems, the user preferred icon arrangement may be generated based further on usage patterns of the other vehicle HMIs associated with the user. For example, the other vehicle HMIs may include a vehicle HMI from another vehicle that user uses and a vehicle HMI from previous vehicle that the user used. This configuration allows the user to easily adapt to the newly designed vehicle HMI. That is, even when the user buys a new vehicle, the vehicle HMI of the new vehicle provides the user interface that suits the user preferences reducing the burden on the user to learn or familiarize him/herself with the newly designed vehicle HMI while the user continues to enjoy the vehicle HMI as he or she did with the vehicle HMI of the previous vehicle.

2. System Configuration

FIG. 1 is a diagram showing an exemplary network system according one embodiment of the present disclosure. A network system 10 includes a vehicle HMI 12X mounted on a vehicle X (not illustrated), a vehicle HMI 12Y mounted on a vehicle Y (not illustrated), a smartphone 14, a smartphone 16, a home network system 18, a server 20, and content sources 22. These components in FIG. 1 are wirelessly connected to each other via a communication network 24. Vehicle HMI 12X and vehicle HMI 12Y may be collectively referred to as "vehicle HMI 12" hereinafter. Similarly, vehicle X and vehicle Y may be collectively referred to as "vehicle" hereinafter.

Content sources 22 include broadcast television and radio sources, video on demand platforms and streaming video and audio services platforms, one or more content data networks, data servers, or web servers and other content servers. Communication network 24 may include a local area network (LAN), wide area network (WAN), the Internet, a cellular network, or a combination thereof. Further, home network system 108 can include, but is not limited to, any one or more of the following network topologies, including a bus network, a star network, a ring network, a mesh network, a star-bus network, tree or hierarchical network, and the like.

Figure 2:
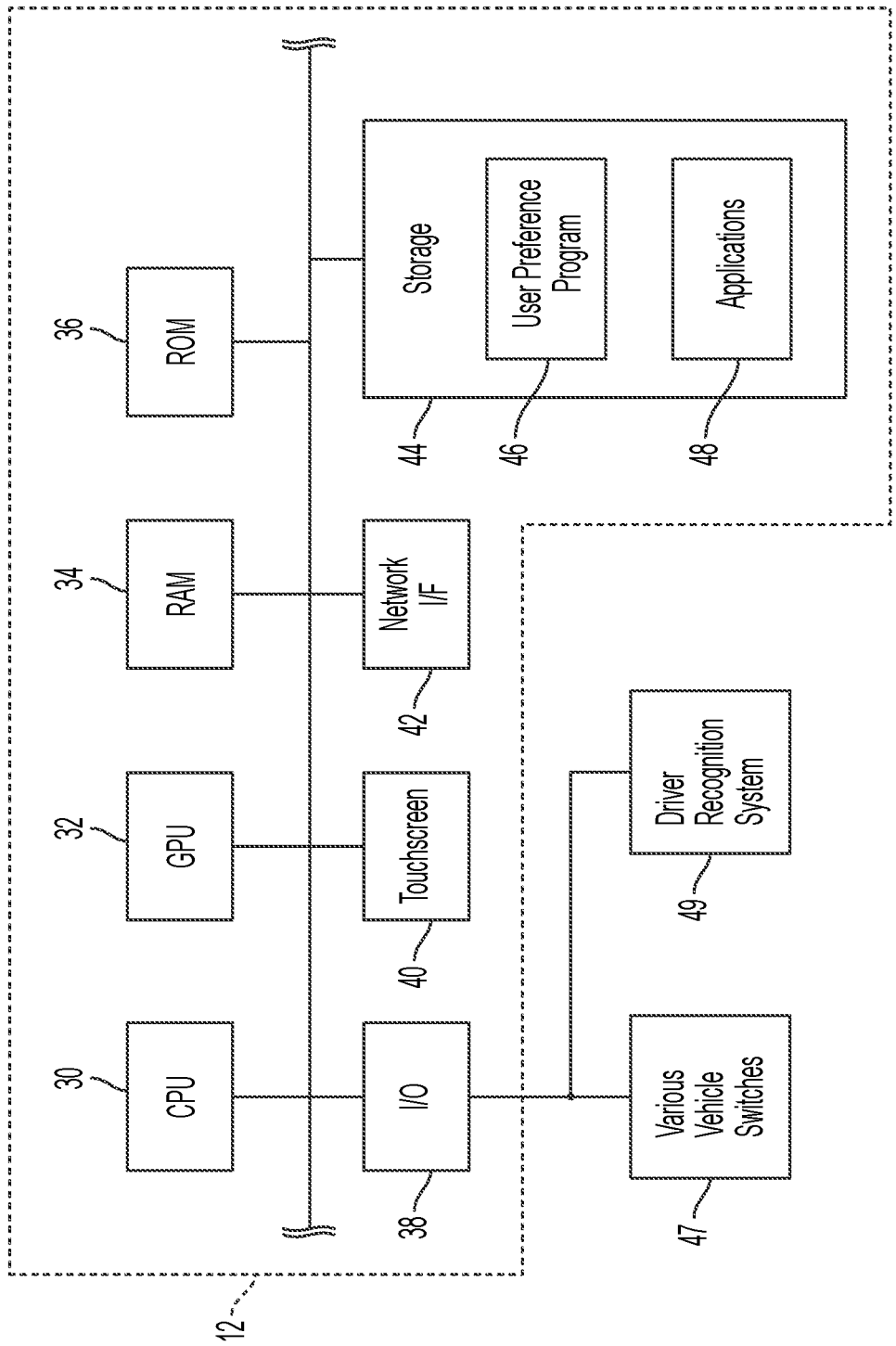
FIG. 2 is a block diagram showing an exemplary vehicle HMI according to example aspects of the present disclosure.

FIG. 2 is a block diagram showing vehicle HMI 12. In this example, vehicle HMI 12 is mounted on a vehicle that may have a manual driving mode and a self-driving mode. The vehicle in the self-driving mode is capable of sensing its external environment and moving safely generally with no human operations. The vehicle may have sensors to perceive surroundings of the vehicle. Examples of the sensors include a radar, a lidar, a sonar, and a GPS. The vehicle in the self-driving mode can use information from those sensors and map information, and can travel on a designated road toward a destination.

As shown in FIG. 2, vehicle HMI 12 includes a CPU (Central Processing Unit) 30 for executing instructions to control vehicle HMI 12, a GPU (Graphics Processing Unit) 32 for handling graphics operations, a RAM (Random-Access Memory) 34 for storing working data and codes, a ROM (Read-Only Memory) 36 that can be any type of non-volatile memory for storing instructions executed by CPU 30, an I/O (Input/Output) 38 connectable to other vehicle systems, a touchscreen 40 for displaying icons and receiving user selection of any of those icons, a network I/F (interface) 42 for providing access to communication network 24, and a storage 44 for storing a user preference program 46 and various applications 48. These components of vehicle HMI 12 are connected to each other via a bus (not illustrated).

I/O 38 is connected to various vehicle systems, for example, a GPS receiver, an audio system, an air conditioning system, and an interior lighting system (not illustrated). I/O 38 is also connected to various vehicle switches 47 and driver recognition system 49.

Various vehicle switches 47 may be coupled to vehicle HMI 12 via I/O 38. Various vehicle switches 47 provide a driver or a passenger with ability to turn ON or turn OFF certain functionalities of a vehicle. For example, various vehicle switches 47 may include an idling stop-start off switch, a steering switch, a shift switch, a parking brake switch, a seat belt switch, a turn signals switch, a hazard switch, a door switch, a power window switch, a wiper switch, a trunk/rear gate opening switch, and so forth.

Driver recognition system 49 may be coupled to vehicle HMI 12 via I/O 38. Driver recognition system 49 recognizes a driver of the vehicle. Driver recognition system 49 may include an image capturing device (not illustrated) that captures one or more images of the driver. Driver recognition system 49 may use facial recognition software to identify the driver of the vehicle from one or more captured images of the driver. In some embodiments, driver recognition system 49 may determine signs of driver fatigue or driver distraction from one or more captured images. Driver recognition system 49 may also include biometric sensors (not illustrated) and use data detected by the biometric sensors to recognize the driver of the vehicle. Driver recognition system 49 transmits a recognition result to vehicle HMI 12 via I/O 38.

Network I/F 42 provides vehicle HMI 12 with access to smartphone 14, smartphone 16, home network system 18, server 20, and content sources 22 via communication network 24. In some embodiments, network I/F 42 may include a wireless modem such as a 5G or higher generation modem allowing vehicle HMI 12 to access smartphone 14, smartphone 16, home network system 18, server 20, and content sources 22. In some other embodiments, network I/F 42 may also allow vehicle HMI 12 to communicate with smartphone 14, smartphone 16, and home network system 18 through Wi-Fi, Bluetooth, NFC, or any other communication technologies.

Upon receiving the recognition result of the driver from driver recognition system 49 via I/O 38, vehicle HMI 12 may transmit user information associated with the recognized driver to server 20 via network I/F 42. In return, vehicle HMI 12 may receive user preferences associated with the recognized driver from server 20, and adjusts the user interface of vehicle HMI 12 according to the received user preferences of the recognized driver. For example, when the recognition result from driver recognition system 49 indicates that the current driver of the vehicle is user A, vehicle HMI 12 transmits user information associated with user A to server 20. In return, vehicle HMI 12 receives user preferences associated with user A, and adjusts the user interface of vehicle HMI 12 according to the user preferences of user A.

The user information may include the recognition result, the action taken by the recognized driver (e.g., started the engine of the vehicle), the time at which the action occurred, and a request to retrieve the user preferences of the recognized driver. The user information may also include the make and model of the vehicle, the version of vehicle HMI 12, the biometrics of the recognized driver, an external temperature, and the like.

User preference program 46, when executed by CPU 30, allows CPU 30 to perform processes to allow vehicle HMI 12 to dynamically adjust to a user preference. For example, in response to transmitting the user information to server 20, vehicle HMI 12 may receive the user preferences associated with the recognized driver (e.g., user A) from server 20. Upon receiving the user preferences, user preference program 46 may rearrange icons to be displayed on touchscreen 40 of vehicle HMI 12 based on the received user preferences, and provide for displaying on touchscreen 40 the rearranged icons.

Various applications 48 may receive streaming contents (e.g., video, music, etc.) from content sources 22. For example, based on the received user preferences, user preference program 46 may download applications to be added to various applications 48 from content sources 22. User preference program 46 may include icons associated with the downloaded applications when rearranging the icons to be displayed on touchscreen 40 of vehicle HMI 12.

In addition to transmitting the user information associated with the recognized driver to server 20 and receiving the user preferences from server 20, vehicle HMI 12 may also maintain information of the recognized driver. The information to be maintained by vehicle HMI 12 may include, for example, positions of a steering wheel and a driver's seat associated with the recognized driver. For example, when driver recognition system 49 recognizes that a driver is user A, vehicle HMI 12 may adjust the positions of the steering wheel and the driver's seat for user A based on the maintained information associated with user A.

Figure 3:
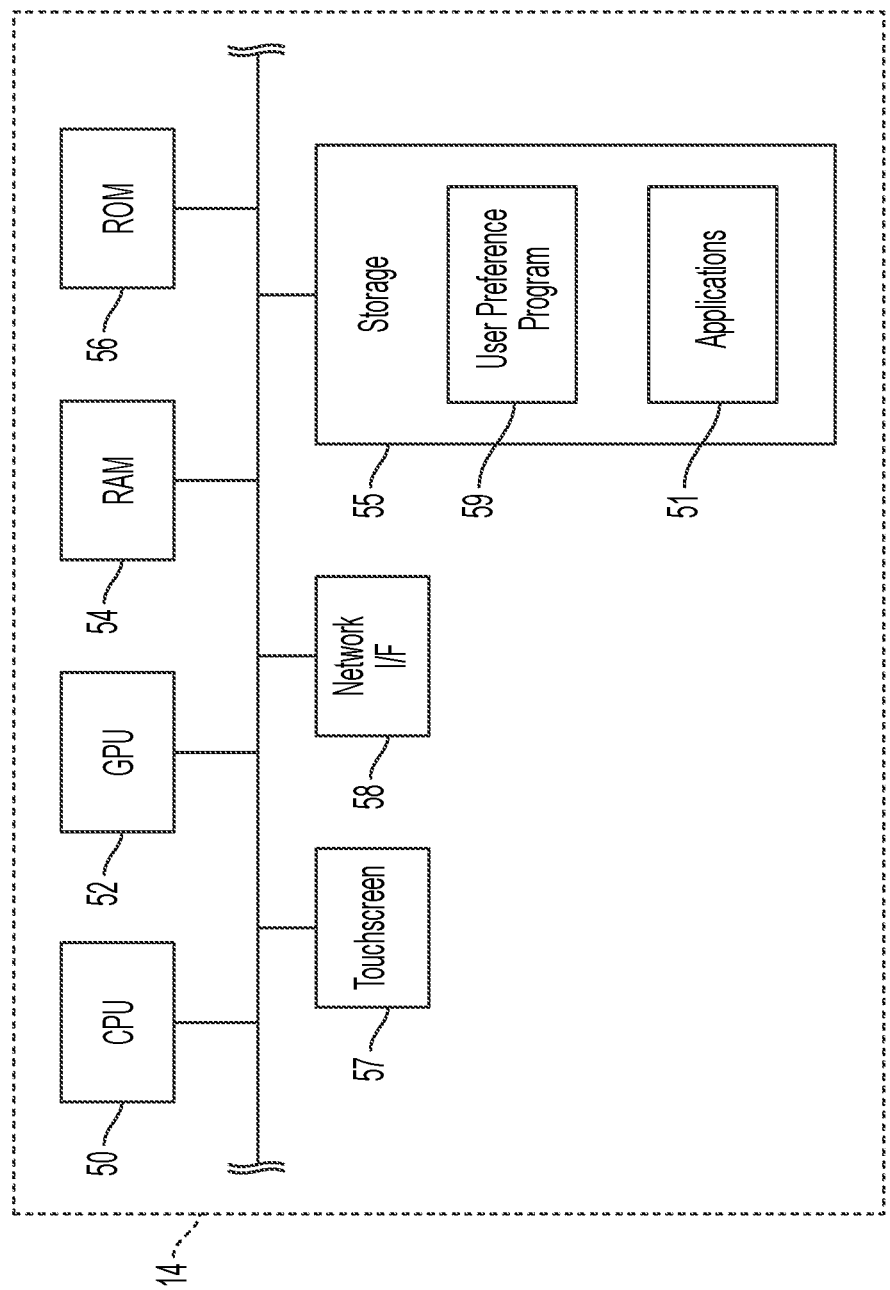
FIG. 3 is a block diagram showing an exemplary smartphone according to example aspects of the present disclosure.

FIG. 3 is a block diagram showing smartphone 14 associated with a user. Smartphone 16 has similar configurations to that of smartphone 14, and thus, the description of the components of smartphone 16 will be omitted. For example, smartphone 14 may be associated with user A, and smartphone 16 may be associated with user B.

Similar to vehicle HMI 12, smartphone 14 includes a CPU 50 for executing instructions to control smartphone 14, a GPU 52 for generally handling graphics operations, a RAM 54 for storing working data and codes, a ROM 56 that can be any type of non-volatile memory for storing applications to be executed by CPU 50, a touchscreen 57, and a network I/F (interface) 58 including for providing smartphone 14 with access to communication network 24 to allow data exchange with other devices (e.g., vehicle HMI 12, home network system 18, server 20, etc.). For example, network I/F 58 may allow smartphone 14 to communicate with vehicle HMI 12 through cellular network, Wi-Fi, Bluetooth, NFC, or any other communication technologies. Smartphone 14 may further include an audio I/O, a camera, and a GPS sensor (not illustrated).

Smartphone 14 also includes a storage 55 for storing applications 51 and a user preference program 59. Applications 51 may include, for example, weather applications for checking the weather forecast, food delivery/ordering applications for ordering food for pick-up or delivery, gaming programs, and applications for streaming videos and music. User preference program 59, when executed by CPU 50, transmits user information associated with user A to server 20. For example, the user information transmitted from user preference program 59 of smartphone 14 to server 20 may include the name of application launched on smartphone 14, the time at which the application is launched, the location of smartphone 14 at the time when the application is launched.

Figure 4:
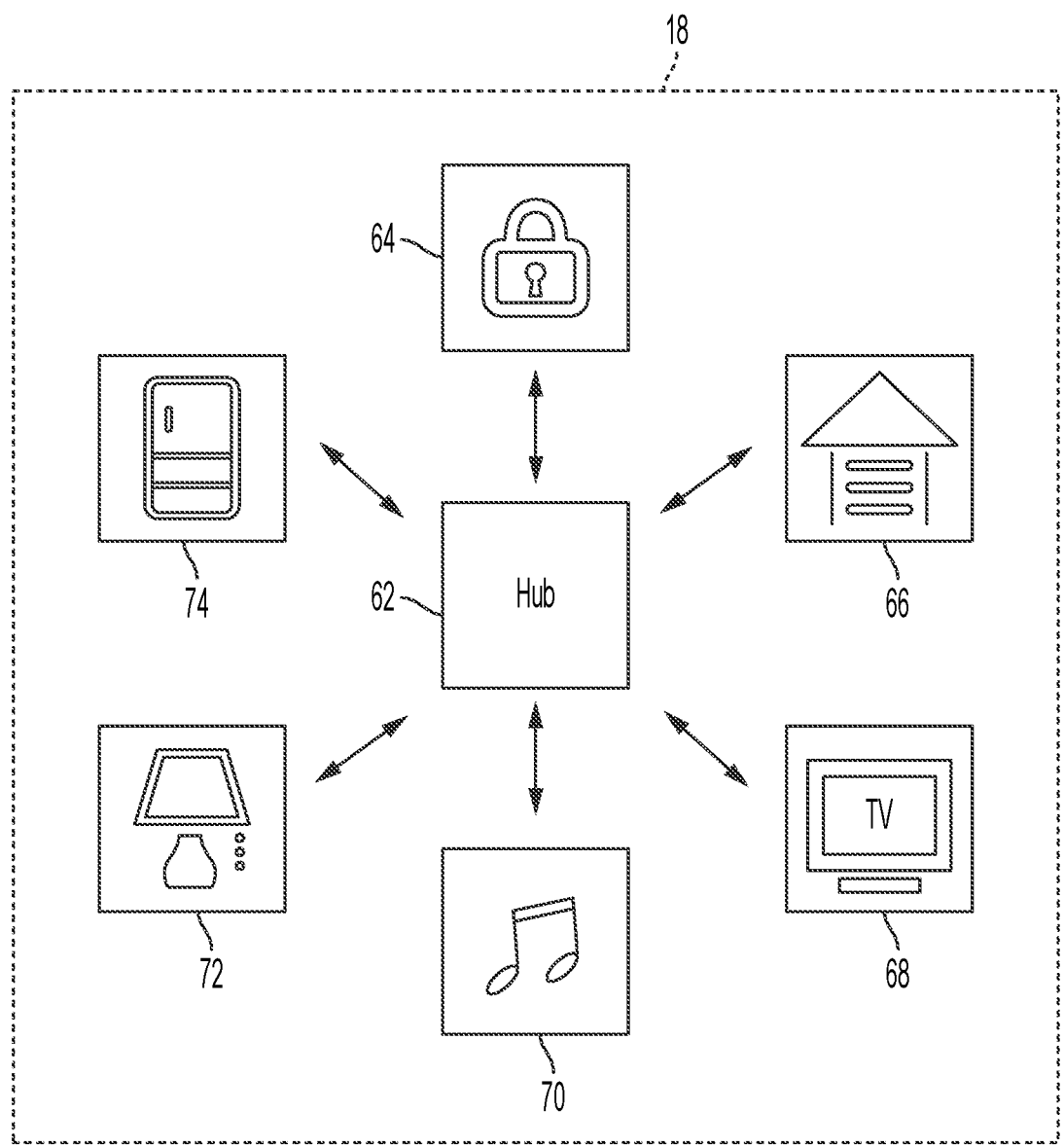
FIG. 4 is a block diagram showing an exemplary home network system according to example aspects of the present disclosure.

FIG. 4 is a block diagram showing home network system 18. For example, home network system 18 may be a home automation system for the residence of user A and user B. Home network system 18 includes a home security system 64 (e.g., a smart door lock system, a security camera system, etc.), a garage door opener 66, a television set 68, an audio system 70, a lighting system 72, and home appliances 74 (e.g., cleaning robot, refrigerator, air conditioners, etc.). Home network system 18 further includes a hub 62 that allows the systems within home network system 18 to communicate with each other.

Hub 62 further allows home network system 18 to transmit to server 20 the user information associated the interactions between user A and the systems on home network system 18 and the interactions between user B and the systems on home network system 18 via communication network 24. For example, when user A turns on television set 68, home network system 18 transmits user information associated with the interaction between user A and television set 68 to server 20 via communication network 24. In another example, in response to user B turning on the air conditioner (i.e., appliances 74), home network system 18 transmits user information associated with the interaction between user B and appliances 74 to server 20 via communication network 24.

Hub 62 allows home network system 18 to be accessible by vehicle HMI 12, smartphone 14, and smartphone 16 via communication network 24. For example, user A uses smartphone 14 to turn on a light in the living room (i.e., lighting system 72). In another instant, user B uses vehicle HMI 12 to open and close a garage door. Yet, in another example, user B uses smartphone 16 to turn on the cleaning robot. In a further example, user A uses smartphone 14 to access feed from the security camera at the residence. In these instances, the operations performed by user A or user B may be transmitted to server 20 via vehicle HMI 12, smartphone 14, and smartphone 16 as part of the respective user information. In other instances, home network system 18 may transmit the operations performed by user A or user B to server 20 as part of the user information.

Figure 5:
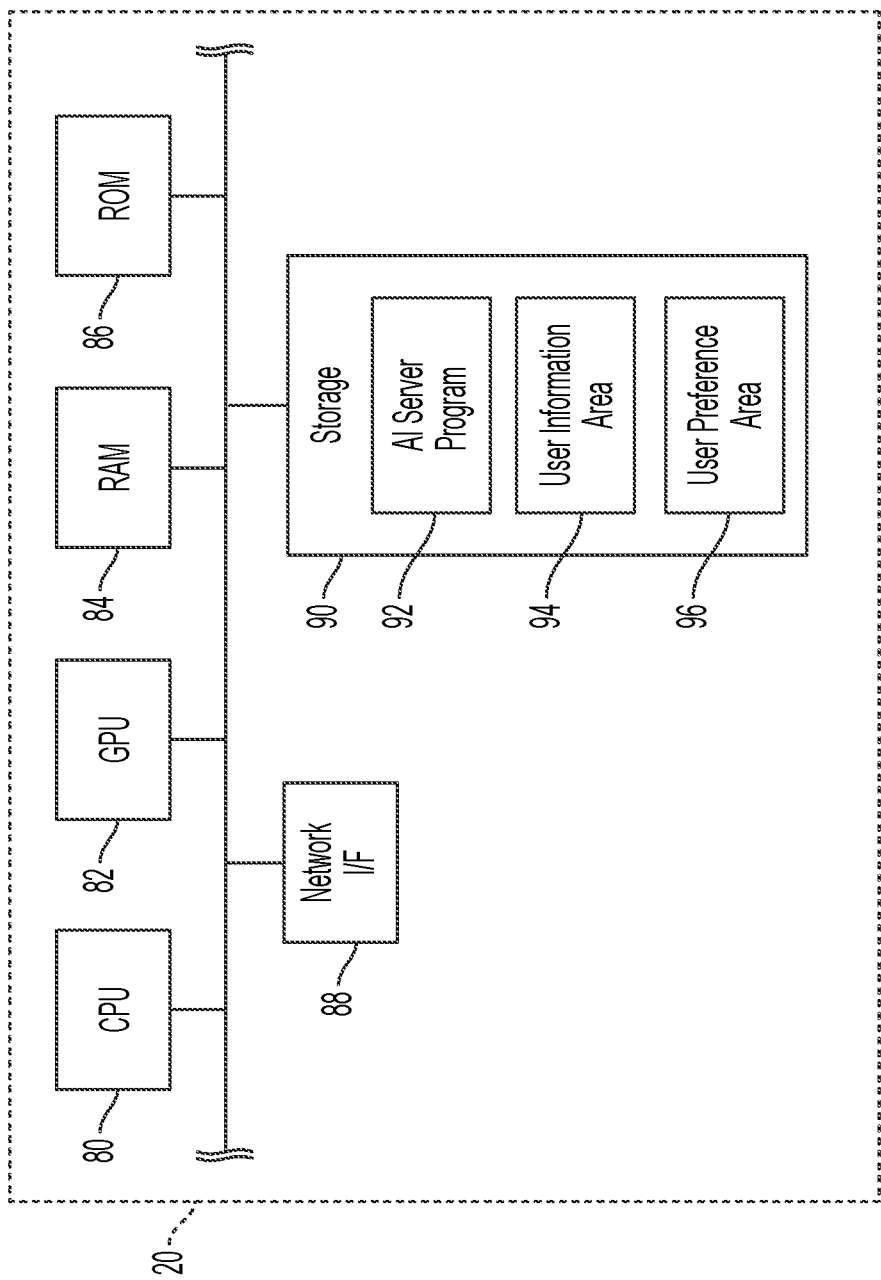
FIG. 5 is a block diagram showing an exemplary server according to example aspects of the present disclosure.

FIG. 5 is a block diagram showing server 20. Server 20 includes a CPU 80 for executing instructions to control sever 20, a GPU 82 for generally handling graphics operations, a RAM 84 for storing working data and codes, a ROM 86 that can be any type of non-volatile memory for storing applications to be executed by CPU 80, a network I/F (interface) 88 for providing access to communication network 24, and storage 90. Storage 90 includes an artificial intelligence (AI) server program 92, a user information area 94, and a user preference area 96.

User information area 94 stores user information collected from vehicle HMI 12, smartphone 14, smartphone 16, and home network system 18. For example, when server 20 receives the user information from vehicle HMI 12, server 20 stores the user information from vehicle HMI 12 in user information area 94. The collected user information may be stored in one or more data tables. The collected user information may be stored in a data table format or other data organization formats. An example of the data table format for user information area 94 will be described later with respect to FIG. 7.

The collected user information may include user identifications associated with respective users. Server 20 may organize user information based on user identifications. For example, when the vehicle detects a driver in a driver's seat, driver recognition system 49 recognizes the driver as user A. When vehicle HMI 12 of the vehicle transmits user information associated with some activities of user A to server 20, vehicle HMI 12 includes in the user information a user identification associated with user A. Similarly, when smartphone 16 transmits user information associated with some user activities on smartphone 16, smartphone 16 includes a user identification associated with user B since smartphone 16 is associated with user B. Home network system 18 may also include a user identification associated with user A since home network system 18 is setup in the residence of user A.

AI server program 92 integrates artificial intelligence and deep machine learning into server 20. AI server program 92 may use various classification schemes or systems to analyze data and perform machine learning. The various classification schemes and systems may include support vector machines, neural networks, expert systems, fuzzy logic, and data fusion engines, can be employed in connection with the present disclosure. For example, in response to server 20 receiving user information from vehicle HMI 12, AI server program 92 analyzes the received user information and generates user preferences based on an analysis result. In some embodiments, AI server program 92 may perform the analysis of the received user information and the generation of the user preferences in response to server 20 receiving a request for user preferences from vehicle HMI 12.

User preference area 96 stores the user preferences in response to AI server program 92 generating the user preferences based on the received user information. In some embodiments, AI server program 92 may update user preferences already stored in user preference area 96 based on newly received user information. In other embodiments, AI server program 92 may update user preferences already stored in user preference area 96 based on newly received user information and user information already stored in user information area 94.

The user preferences stored in user preference area 96 may indicate the user's usage patterns of applications on vehicle HMI 12, smartphone 14, smartphone 16, and home network system 18. Based on the user preferences and the usage patterns, AI server program 92 perform automatic provisioning of vehicle HMI 12 on a new vehicle to suit a user's liking, and reconfigure the vehicle HMI to fit user's lifestyle.

3. Sending of User Information on User Activities

Figure 6:
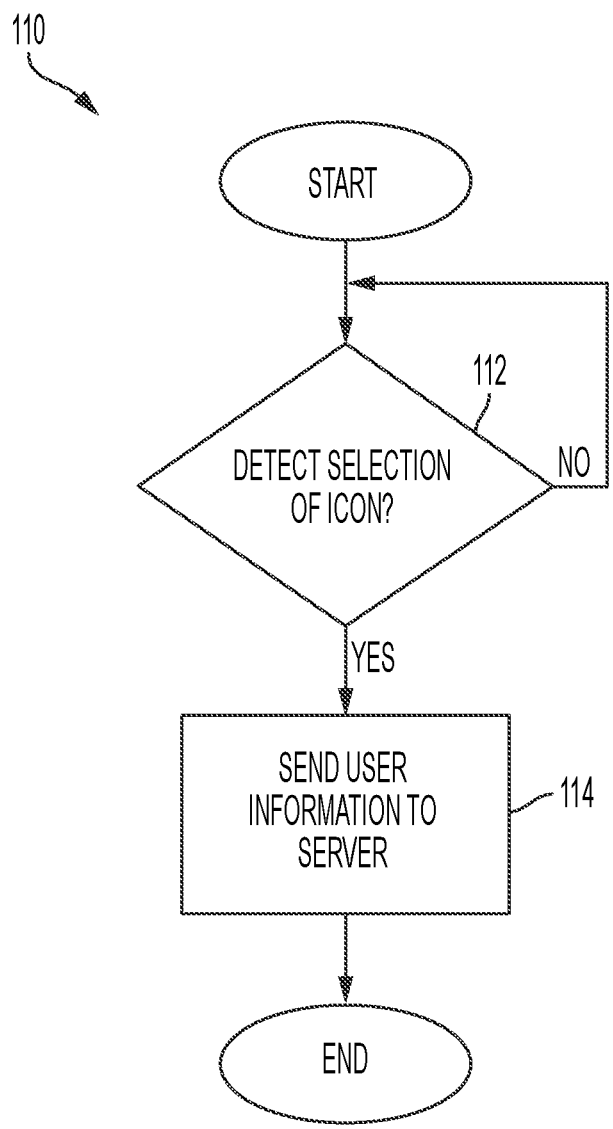
FIG. 6 is a flowchart showing an exemplary process of sending user information from the vehicle HMI to the server according to example aspects of the present disclosure.

FIG. 6 is a flowchart showing an exemplary process 110 of sending the user information from vehicle HMI 12 to server 20 according to example aspects of the present disclosure. The process 110 starts with block 112 in which whether user selection is detected on an icon displayed on the user interface of vehicle HMI 12 is determined. When user selection is not detected on an icon displayed on the user interface of vehicle HMI 12 (block 112: No), the process 110 repeats block 112. When user selection is detected on an icon displayed on the user interface of vehicle HMI 12 (block 112: Yes), the process 110 proceeds to block 114. In block 114, user preference program 46, when executed by CPU 30, causes vehicle HMI 12 to transmit user information associated with the selected icon to server 20. The user information may include information on (1) a function associated with the selected icon, (2) when the icon is selected, and (3) where vehicle HMI 12 is located when the icon is selected. Similar process as shown in FIG. 6 may be performed by user preference program 59 of smartphone 14 and smartphone 16 to send user information associated with activities detected on smartphone 14 and smartphone 16, respectively.

FIG. 7 is exemplary data tables stored in user information area 94 of server 20 according to example aspects of the present disclosure. Upon receiving user information associated with user A from vehicle HMI 12, smartphone 14, and home network system 18, AI server 20 stores the received user information in user information area 94 of storage 90. User information area 94 includes Table 1 that stores user information transmitted from smartphone 14, Table 2 that stores user information transmitted from vehicle HMI 12, and Table 3 that stores user information transmitted from home network system 18. The number of tables stored in user information area 94 is not limited to three as depicted in FIG. 7, but the number of tables may be one or more.

Upon detecting user activities (i.e., user selection of an icon, launch of an application, and launch of a home system) on vehicle HMI 12, smartphone 14, and home network system 18, the user information associated with the user activities is transmitted to server 20. The user information may include (1) the selected icon/system, (2) the timestamp of when the icon/system is selected, and (3) the location of the device (i.e., vehicle HMI 12, smartphone 14, and home network system 18) at the time the icon/system is selected. The user information may optionally include (4) the weather information (e.g., weather, temperature) associated with the location.

For example, after waking up in the morning, user A selects a weather application icon on smartphone 14 to check the weather forecast. Upon user selection of the weather application on smartphone 14, smartphone 14 transmits user information to server 20: (1) weather application; (2) Thursday, Apr. 8, 2021, 07:00 AM; (3) Home; and (4) Cloudy, 38° F. Upon receiving the user information associated with the weather application, server 20 stores the user information in table 1 associated with smartphone 14 as depicted in FIG. 7.

User A commutes to work by car (e.g., vehicle X). Once user A is ready to leave the residence, user A gets into vehicle X on which vehicle HMI 12 (i.e., vehicle HMI 12X) is mounted. When user A gets into vehicle X, user A first turns on a seat heater using a seat heater icon displayed on the user interface of vehicle HMI 12. Upon detecting user selection of the seat heater icon, vehicle HMI 12 transmits user information associated with the seat heater icon to server 20: (1) seat heater (ON); (2) Thursday, Apr. 8, 2021, 8:00 AM; (3) Home; and (4) Cloudy, 40° F. Upon receiving the user information, server 20 stores the received user information in table 2 associated with vehicle HMI 12 as depicted in FIG. 7.

While user A awaits for vehicle X to warm up, user A selects an idling stop-start off icon displayed on the user interface of vehicle HMI 12. Upon detecting user selection of the idling stop-start off icon, vehicle HMI 12 transmits user information associated with the idling stop-start off icon to server 20: (1) idling stop-start off (selected); (2) Thursday, Apr. 8, 2021, 08:03 AM; (3) Home; and (4) Cloudy, 40° F. Upon receiving the user information, server 20 stores the received user information in table 2 associated with vehicle HMI 12 as depicted in FIG. 7.

Once vehicle X is warmed up, user A selects a garage opener icon displayed on the user interface of vehicle HMI 12 to close the garage door of user A's residence. While user A awaits for the garage door to close, user A selects a radio icon displayed on the user interface of vehicle HMI 12 to tune into a radio station (e.g., FM95.5). Vehicle HMI 12 transmits user information associated with the garage opener icon to server 20: (1) garage opener (selected); (2) Thursday, Apr. 8, 2021, 08:04 AM; (3) Home; and (4) Cloudy, 40° F. Vehicle HMI 12 also transmits user information associated with the radio icon to server 20: (1) radio (FM95.5); (2) Thursday, Apr. 8, 2021, 08:04 AM; (3) Home; and (4) Cloudy, 40° F. Upon receiving the user information, server 20 stores the received user information in table 2 associated with vehicle HMI 12 as depicted in FIG. 7.

While at work, user A heads out to a lunch meeting at a restaurant. Since user A is not familiar with the restaurant, user A selects a navigation icon displayed on the user interface of vehicle HMI 12 and sets the destination to the restaurant (e.g., the name of the restaurant may be "Ukai Restaurant"). Vehicle HMI 12 transmits user information associated with the navigation icon to server 20: (1) navigation (Ukai Restaurant); (2) Thursday, Apr. 8, 2021, 12:05 PM; (3) Work; and (4) Sunny, 62° F. Upon receiving the user information, server 20 stores the received user information in table 2 associated with vehicle HMI 12 as depicted in FIG. 7.

After work, user A selects the navigation icon displayed on the user interface of vehicle HMI 12 and set the destination to home to avoid traffic. In the same manner as described above, vehicle HMI 12 transmits user information associated with the navigation icon to server 20. Server 20 stores the transmitted user information in table 2. When user A arrives in front of the residence, user A opens the garage door using the garage opener icon displayed on the user interface of vehicle HMI 12. Vehicle HMI 12 transmits user information associated with the garage opener icon to server 20. Server 20 stores the transmitted user information in table 2.

While awaiting for the garage door to open, user A launches a home lighting system application on smartphone 14, and turns the lights in the residence on. Smartphone 14 transmits user information associated with the home lighting system application to server 20. Server 20 stores the transmitted user information in table 1. After dinner, user A launches a video streaming service application on smartphone 14 to watch a television show. Smartphone 14 transmits user information associated with the video streaming service application to server 20. Server 20 stores the transmitted user information in table 1.

After watching the television show, user A turns on a home security system connected to home network system 18. Particularly, user A turns on a remote camera. Upon detecting the operation by user A, home network system 18 transmits user information associated with the home security system to server 20: (1) home security (remote camera: ON); (2) Thursday, Apr. 8, 2021, 10:22 PM; (3) Home; and (4) Clear, 44° F. Upon receiving the user information, server 20 stores the received user information in table 3 associated with home network system 18 as depicted in FIG. 7.

On Saturday morning, user A uses a vacuum connected to home network system 18 to clean the residence. Home network system 18 transmits user information associated with the vacuum (i.e., cleaning device) to server 20: (1) vacuum (ON); (2) Saturday, Apr. 10, 2021, 09:18 AM; (3) Home; and (4) Sunny, 51° F. Upon receiving the user information, server 20 stores the received user information in table 3 associated with home network system 18 as depicted in FIG. 7. On Saturday night, user A launches the video streaming service application on smartphone 14 to watch a television show that user A watches every Saturday night. Smartphone 14 transmits user information associated with the video streaming service application to server 20. Server 20 stores the user information in table 1 associated with smartphone 14.

On Sunday morning, user A orders lunch from a food delivery service via smartphone 14. Smartphone 14 transmits user information associated with the food delivery application to server 20. Server 20 then stores the user information in table 1 associated with smartphone 14. After lunch, user A passes time by playing a game on smartphone 14. Smartphone 14 transmits user information associated with the game application to server 20. Server 20 stores the user information in table 1 associated with smartphone 14.

4. Generation of User Preference

Figure 8:
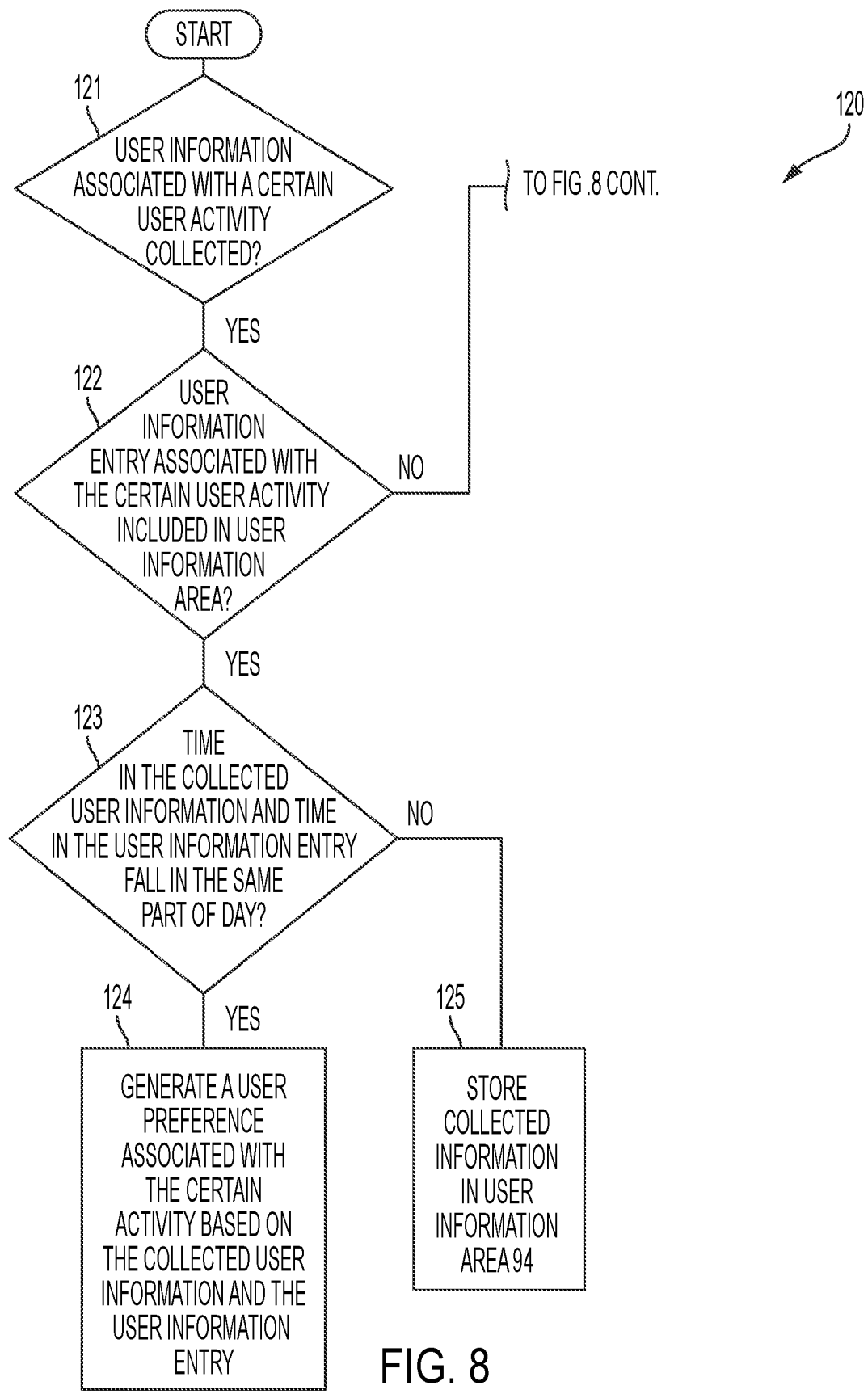
FIG. 8 is a flowchart showing an exemplary process for analyzing user information and generating user preferences according to example aspects of the present disclosure.
Figure 8:
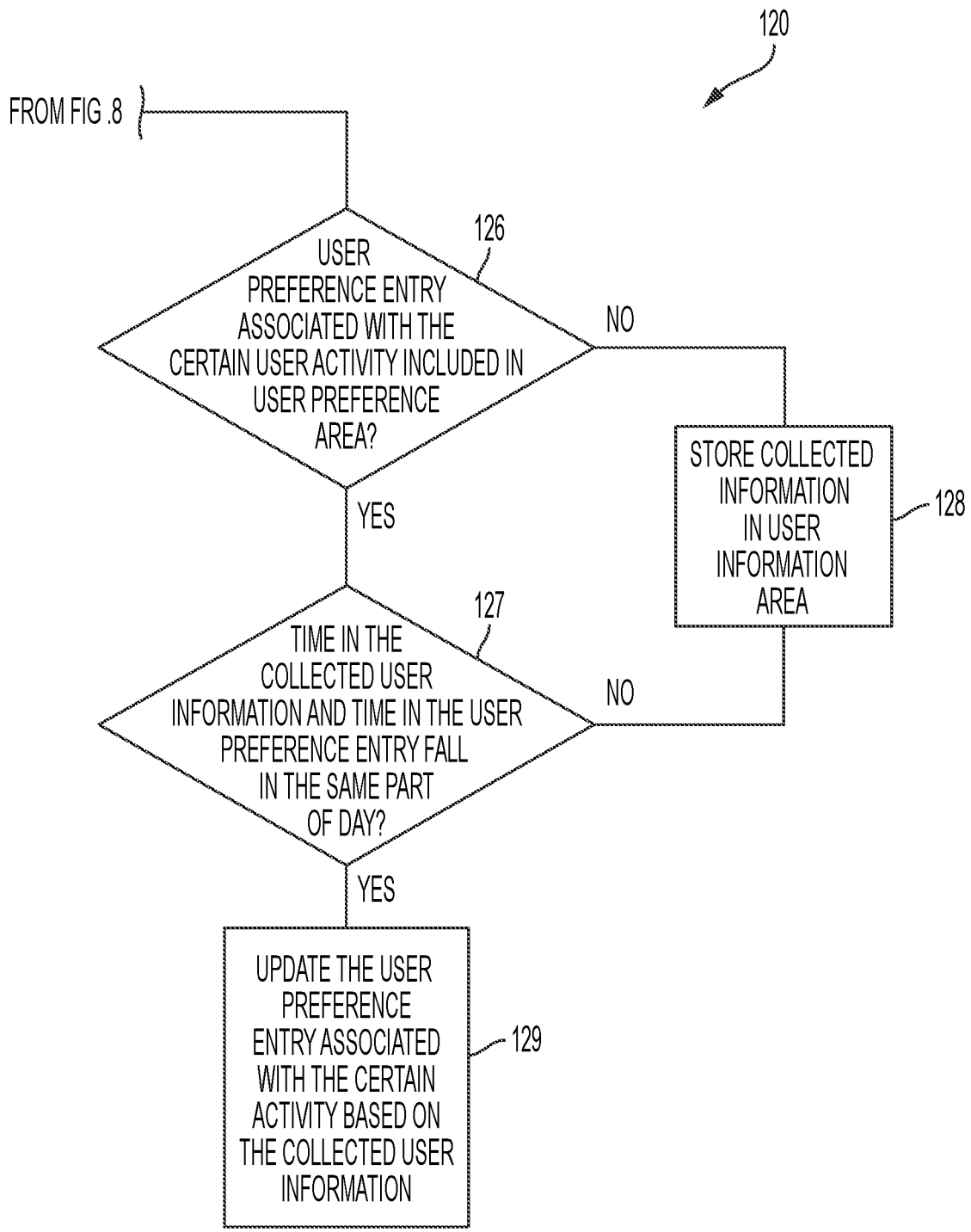

FIG. 8 is a flowchart showing an exemplary process 120 for analyzing user information and generating user preferences according to example aspects of the present disclosure. Process 120 starts at block 121 in which whether user information associated with a certain user activity (e.g., user selection of an icon in vehicle HMI 12, launch of an application in smartphone 14 or smartphone 16, activation of a system in home network system 18) is collected from at least one of vehicle HMI 12, smartphone 14, smartphone 16, and home network system 18. When user information is not collected from at least one of vehicle HMI 12, smartphone 14, smartphone 16, and home network system 18 (block 121: No), process 120 repeats block 121. When user information is collected from at least one of vehicle HMI 12, smartphone 14, smartphone 16, and home network 18 (block 121: Yes), process 120 proceeds to block 122.

At block 122, whether user information area 94 includes a user information entry associated with the certain user activity is determined. When user information area 94 does not include a user information entry associated with the certain user activity (block 122: No), process 120 proceeds to block 126. When user information areas 94 includes a user information entry associated with the certain user activity (block 122: Yes), process 120 proceeds to block 123.

At block 123, whether both the time indicated in the collected user information and the time indicated in the user information entry in user information area 94 fall within the same part of the day is determined. For example, parts of the day include the morning hours (e.g., 5:00 AM-11:00 AM), the midday hours (e.g., 11:00 AM-4:00 PM), the evening hours (e.g., 4:00 PM-9:00 PM), or the night hours (e.g., 9:00 PM-5:00 AM). When both the time indicated in the collected user information and the time indicated in the user information entry in user information area 94 fall within the same part of the day (block 123: Yes), process 120 proceeds to block 124.

In some embodiments, process 120 proceeds to block 124 when it is determined at block 123 that the time indicated in the collected user information is within a predetermined time period (e.g., 15 minutes, 30 minutes, 1 hour, etc.) of the time indicated in the user information entry included in user information area 94 is determined in addition to both the time indicated in the collected user information and the time indicated in the user information entry in user information area 94 falling within the same part of the day.

At block 124, AI server program 92, when executed by CPU 80, causes server 20 to generate a user preference associated with the certain activity based on the collected user information and the user information entry included in user information area 94. The generated user preference associated with the certain activity is stored in user preference area 96. In some embodiments, in response to the user preference associated with the certain activity being generated and stored in user preference area 96, server 20 may delete the user information entry used to generate the user preference from user information area 94.

When both the time indicated in the collected user information and the time indicated in the user information entry in user information area 94 do not fall within the same part of the day (block 123: No), process 120 proceeds to block 125 where the collected user information is stored in user information area 94.

Returning to block 122, when user information area 94 does not include a user information entry associated with the certain user activity (block 122: No), process 120 proceeds to block 126. At block 126, whether a user preference entry associated with the certain user activity is included in user preference area 96 is determined. When user preference area 96 does not include a user preference entry associated the certain user activity (block 126: No), process 120 proceeds to block 128. When user preference area 96 includes a user preference entry associated with the certain user activity (block 126: Yes), process 120 proceeds to block 127.

At block 127, whether both the time indicated in the collected user information and the time indicated in the user preference entry in user preference area 96 fall within the same part of the day is determined. When the time of the day indicated in the collected user information is within the predetermined time period of the time of the day indicated in the user preference entry included in user preference area 96 (block 127: Yes), process 120 proceed to block 129. At block 129, AI server program 92, when executed by CPU 80, causes server 20 to update the user preference entry associated with the certain activity based on the collected user information.

When both the time indicated in the collected user information and the time indicated in the user preference entry in user preference area 96 do not fall within the same part of the day (block 127: No), process 120 proceeds to block 128. At block 128, the collected user information is stored in user information area 94.

In some embodiments, the collected user information may be stored in user information area 94 while server 20 performs the blocks (e.g., blocks 121-129) of process 120. Server 20 may remove the collected user information from user information area 94 when process 120 reaches block 124 or block 129, and may maintain the collected user information in user information area 94 when process 120 reaches block 125 or block 128.

In some embodiments, process 120 proceeds from block 121 to block 122 when a predetermined period of time (e.g., 1 week, 1 month, etc.) has passed since an initial entry is made in user information area 94. This configuration provides for reducing computational cost and increasing the accuracy of determining user preferences.

FIG. 9 is an exemplary data table stored in user preference area 96 of server 20 according to example aspects of the present disclosure. The user preference table depicted in FIG. 9 includes user preferences entries generated based on user information collected over a period of one month (e.g., Apr. 8, 2021-May 8, 2021). For the user information collected during the period of one month, server 20 performed process 120 to add user preference entries to the user preference table.

For example, server 20 receives user information associated with the seat heater icon from vehicle HMI 12: (1) seat heater (ON); (2) Friday, Apr. 9, 2021, 7:57 AM; (3) Home; and (4) Rain, 38° F. Upon receiving the user information associated with the seat heater icon, server 20 looks up the data tables in user information area 94 to check whether an entry associated with the seat heater icon is included in the data tables in user information area 94.

When user information area 94 includes an entry associated with the seat heater icon, server 20 determines whether both the time (i.e., Friday, Apr. 9, 2021, 7:57 AM) indicated in the received user information and the time (i.e., Thursday, Apr. 8, 2021, 08:00 AM) in the user information entry included in the data table in user information area 94 fall within the same part of the day (i.e., morning hours).

When the time indicates in the received user information and the time indicated in the user information entry included in the data table in user information area 94 fall within the morning hours (e.g., 5:00 AM-11:00 AM), server 20 generates a user preference associated with the seat heater icon based on the received user information and the user information entry in user information area 94. Server 20 then stores the generated user preference in the user preference table in user preference area 96. The user preference may include: (i) user activity; (ii) part of the day; (iii) weekday/weekend; (iv) location; (v) temperature; and (vi) frequency (i.e., number of occurrences). For example, the user preference associated with seat heater may include: (i) seat heater; (ii) morning; (iii) weekday; (iv) home; (v) 38-40° F.; and (vi) Morning—2 (i.e., number of occurrences in different parts of the day).

5. Providing User Preferences to Vehicle HMI

Figure 10:
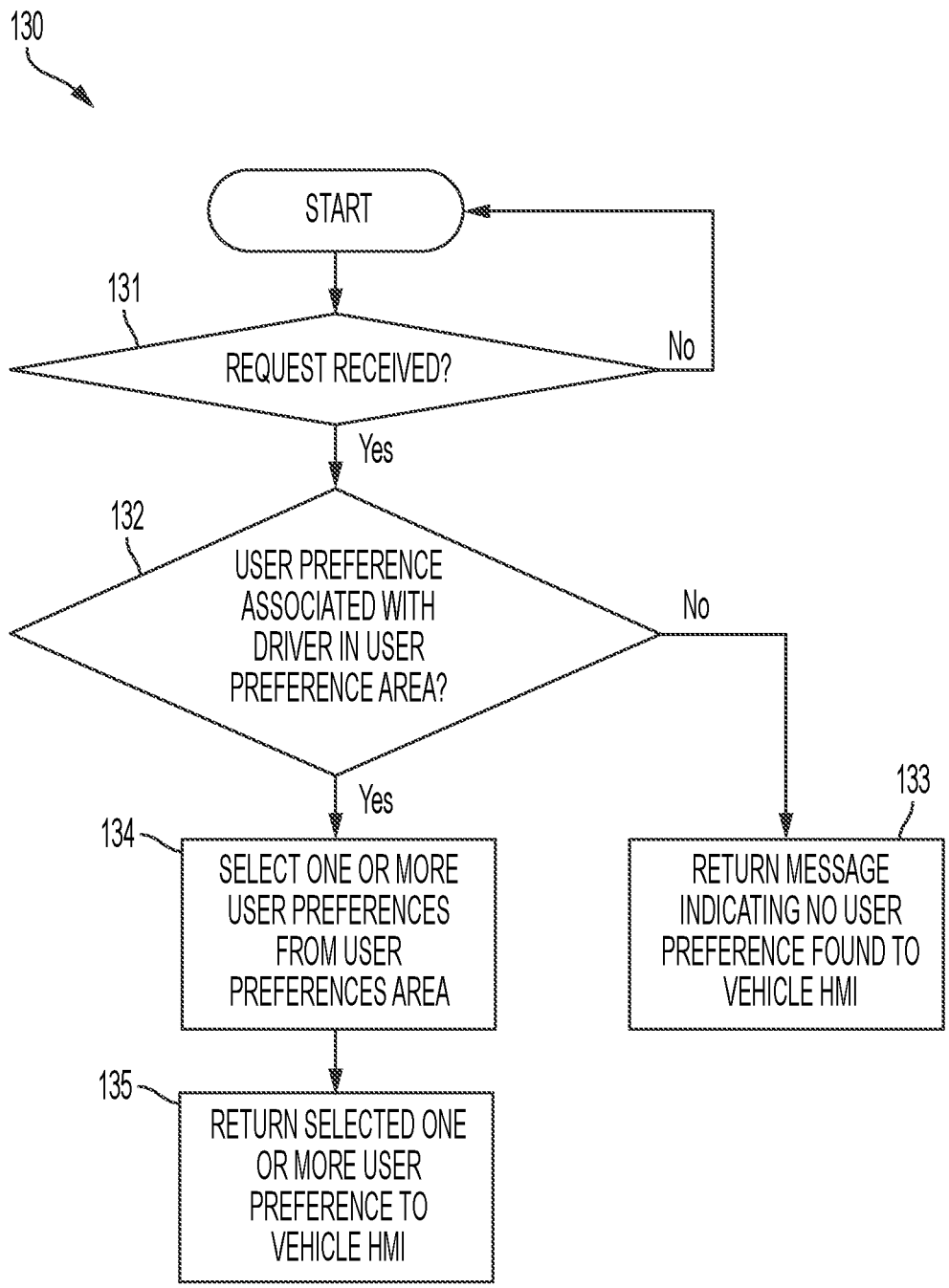
FIG. 10 is a flow chart showing an exemplary process of generating a user preference according to example aspects of the present disclosure.

FIG. 10 is a flowchart showing an exemplary process 130 of providing user preferences to vehicle HMI 12. Process 130 starts at block 131 in which whether server 20 received a request for establishing a communication from vehicle HMI 12 is determined. For example, vehicle HMI 12 may transmit a request for establishing the communication to server 20 when the engine of the vehicle is started. The request may include the recognition result of the driver recognized by driver recognition system 49 and a request for user preferences associated with the recognized driver.

When server 20 does not receive the request from vehicle HMI 12 (block 131: No), process 130 repeats block 131. When server 20 receives the request from vehicle HMI 12 (block 131: Yes), process 130 proceeds to block 132 where whether user preferences associated with the recognized driver are stored in user preference area 96 is determined. In some embodiments, the request may include the location of the vehicle on which vehicle HMI 12 is mounted, current time and date information, and weather information (e.g., outside temperature).

When the user preferences associated with the recognized driver are not found in user preference area 96 (block 132: No), process 130 proceeds to block 133 in which server 20 returns to vehicle HMI a message indicating that no user preferences associated with the recognized driver are found in user preferences area 96.

When the user preferences associated with the recognized driver are stored in user preference area 96 (block 132: Yes), process proceeds to block 134. At block 134, server 20 selects one or more user preferences to be sent to vehicle HMI 12. Server 20 may select one or more user preferences from the user preferences stored in user preferences area 96 in accordance with the current time and today's day of the week. In some embodiments, server 20 may select one or more user preferences in accordance with the information (i.e., the location of the vehicle on which vehicle HMI 12 is mounted, current time and date information, and weather information) included in the request from vehicle HMI 12.

For example, when the current time is 7:50 AM and today's day of the week is Monday, server 20 determines that the current time of 7:50 AM corresponds to the "Morning" part of the day, and further determines today's day of the week of Monday corresponds to "Weekdays." Based on the determination result, server 20 refers to the user preference table (i.e., user preference table shown in FIG. 9) and selects user preferences that include "Morning" in the "Part of the Day" category and "Weekdays" in the "Weekdays/Weekend" category. For example, server 20 selects user preferences associated with "seat heater," "idling stop-start off," "garage opener," "radio," and "weather application" which all have "Morning" in the "Part of the Day" category and "Weekdays" in the "Weekdays/Weekend" category.

After server 20 selects one or more user preferences from user preference area 96 at block 134, process 130 proceeds to block 135 in which server 20 returns the selected one or more user preferences to vehicle HMI 12.

In some embodiments, vehicle HMI 12 may send the request for establishing communication to server 20 without including the recognized driver information or the request for user preferences associated with the recognized driver. This configuration allows vehicle HMI 12 and server 20 to confirm secure communication between each other before sending the recognized driver information.

5. Arrangement of Icons on Vehicle HMI Based on User Preferences

FIGS. 11A-11G are exemplary icon arrangements on touchscreen 40 of vehicle HMI 12 based on user preferences. When vehicle HMI 12 receives one or more user preferences from server 20, vehicle HMI 12 uses the received one or more user preferences to adjust the arrangement of icons displayed on touchscreen 40 of vehicle HMI 12. This configuration allows vehicle HMI 12 to rearrange the icons to suit the user's usage pattern.

Figure 11A:
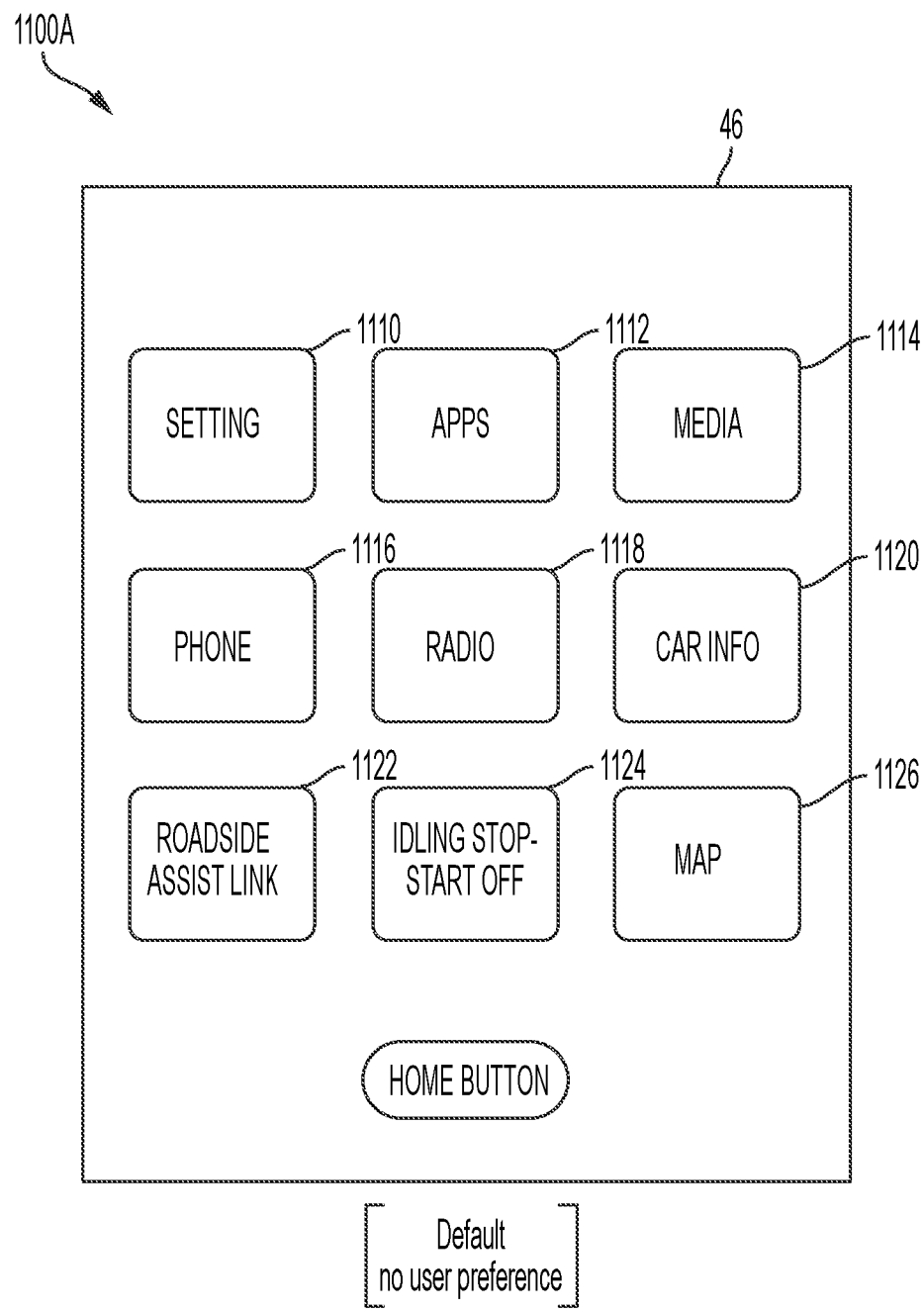
FIGS. 11A-11G are exemplary icon arrangements on a touchscreen of the vehicle HMI based on user preferences according to example aspects of the present disclosure.

FIG. 11A illustrates a default icon arrangement 1100A. The default icon arrangement 1100A may be a manufacture default setting such that the default icon arrangement does not reflect any customization for the user. Default icon arrangement 1100A includes three rows of icons. The number of rows is not limited to three rows as depicted in FIG. 11A, but may be less or more than three rows. The top row of default icon arrangement 1100A includes a setting icon 1110, an applications icon 1112, and a media icon 1114. The middle row of default icon arrangement 1100A includes a phone icon 1116, a radio icon 1118, and a car information icon 1120. The bottom row of default icon arrangement 1100A includes a roadside assistant link icon 1122, an idling stop-start off icon 1124, and a map icon 1126.

Figure 11B:
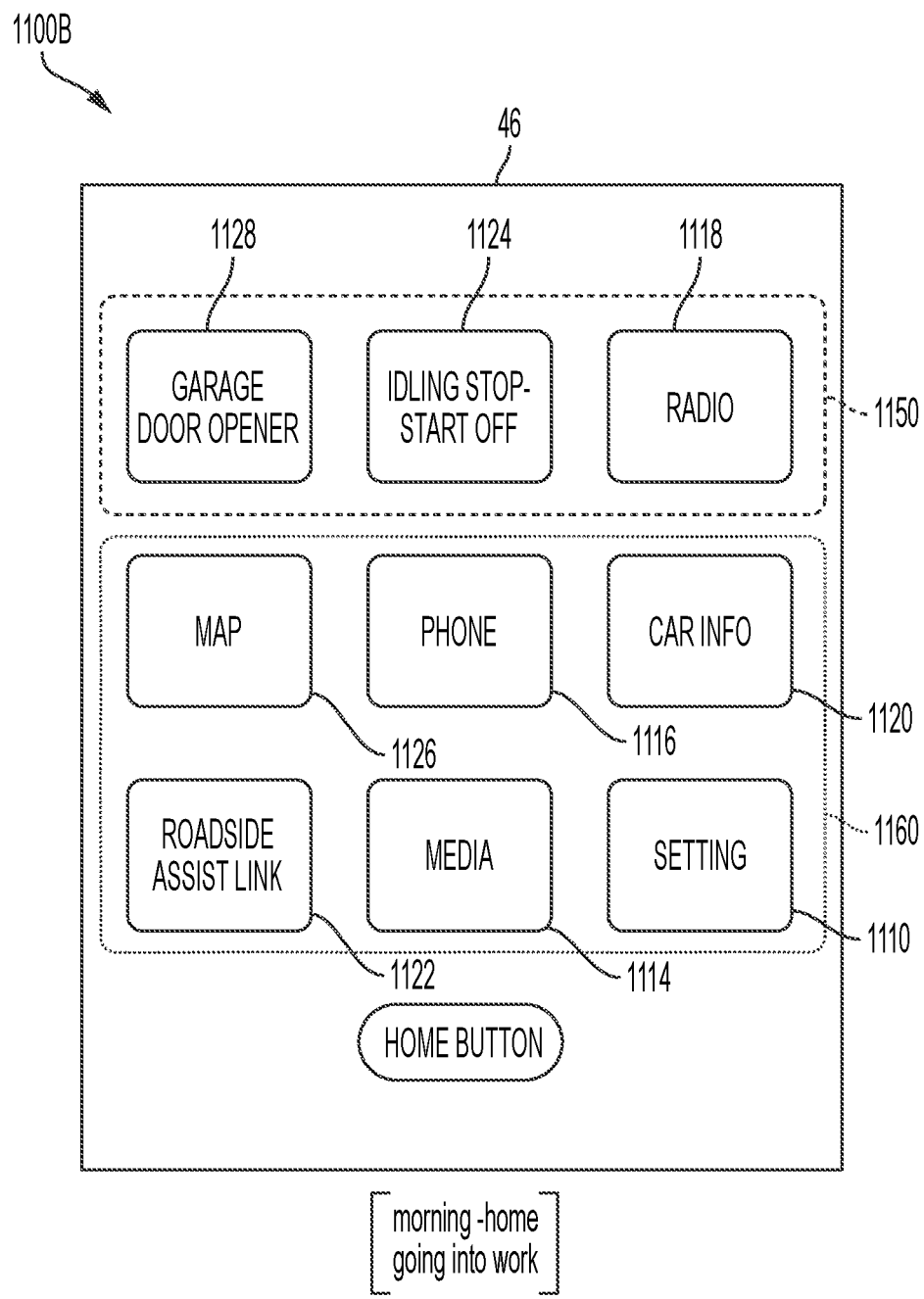

FIG. 11B illustrates an icon arrangement 1100B in which icons are rearranged according to one or more user preferences transmitted from server 20. For example, icon arrangement 1100B may be presented to the user when the user is leaving the residence to go to work in the morning of a weekday. Accordingly, in icon arrangement 1100B, the icons may be arranged according to one or more user preferences selected based on the request including the location of vehicle as "home" and the time and date as "Monday, May 10, 2021, 07:50 AM". Based on the location of vehicle being "home" and the time and date being "Monday, May 10, 2021, 07:50 AM", one or more user preferences returned from server 20 may be associated with "seat heater", "idling stop-start off", "garage opener", "radio", and "weather application" which all have "Morning" in the "Part of the Day" category and "Weekdays" in the "Weekdays/Weekend" category.

Vehicle HMI 12 rearranges the icons to be displayed on touchscreen 40 to reflect the returned one or more user preferences such that the top row of icon arrangement 1100B includes a garage door opener icon 1128, idling stop-start off icon 1124, and radio icon 1118; the middle row of icon arrangement 1100B includes map icon 1126, phone icon 1116, and car information icon 1120; and the bottom row of icon arrangement 1100B includes roadside assist link icon 1122, media icon 1114, and setting icon 1110.

The top row of icon arrangement 1100B includes the icons with which the returned one or more user preferences are associated: garage door opener icon 1128; idling stop-start off icon 1124; and radio icon 1118. For example, during the weekdays, when the user is leaving for work from the residence, the user tends to close the garage door of the residence using garage door opener icon 1128. While awaiting the garage door to close, the user tends to presses idling stop-start off icon 1124 to turn off the idling stop-start function of the vehicle, and presses radio icon 1118 to tune into a radio station to catch up on current events and listen to music on the way to work. Accordingly, arranging the icons that are frequently used in the morning of weekdays on the top row provides the user with convenience and reduces the user's burden of taking multiple steps to even reach to the icons (e.g., moving to another tab on touchscreen 40, going into applications icon 1112 to find the icons).

The order of the icons displayed on the top row of icon arrangement 1100B may be determined based on the frequency of occurrence associated with the icon indicated in the returned one or more user preferences (e.g., more frequently used icons closer to the user's side than less frequently used icons). In some embodiments, the icons associated with the returned one or more user preferences may be arranged in the column closest to the user's side. In some embodiments, the user may set one or more rows or one or more columns for displaying the icons associated with one or more user preferences. In some other embodiments, the order of the icons associated with the user preferences and the locations of the icons with the user preferences displayed on touchscreen 40 may be determined based on the user's eye movements. For example, the eye movement may be tracked by driver recognition system 49 or other eye tracking system mounted in the vehicle.

Vehicle HMI 12 may provide a personalized area 1150 on touchscreen 40. Personalized area 1150 may be an area on touchscreen 40 designated for display of the icons that are associated with the returned one or more user preferences. For example, personalized area 1150 may be outlined (e.g., bold line along the perimeter of personalized area 1150) to distinguish personalized area 1150 over the other area on touchscreen 40. In some embodiments, vehicle HMI may provide a default area 1160 on touchscreen 40. Default area 1160 may be an area on touchscreen 40 designated for display of the icons that are not associated with the returned one or more user preferences. Personalized area 1150 and default area 1160 do not overlap one another. The number of icons in personalized area 1150 may change based on the change in the number of icons associated with the returned one or more user preferences. In some embodiments, the number of icons in personalized area 1150 may be fixed. The number of icons in personalized area 1150 is not limited to three icons as depicted in FIG. 11B, but the number of icons in personalized area 1150 may be less or more than three icons.

Figure 11C:
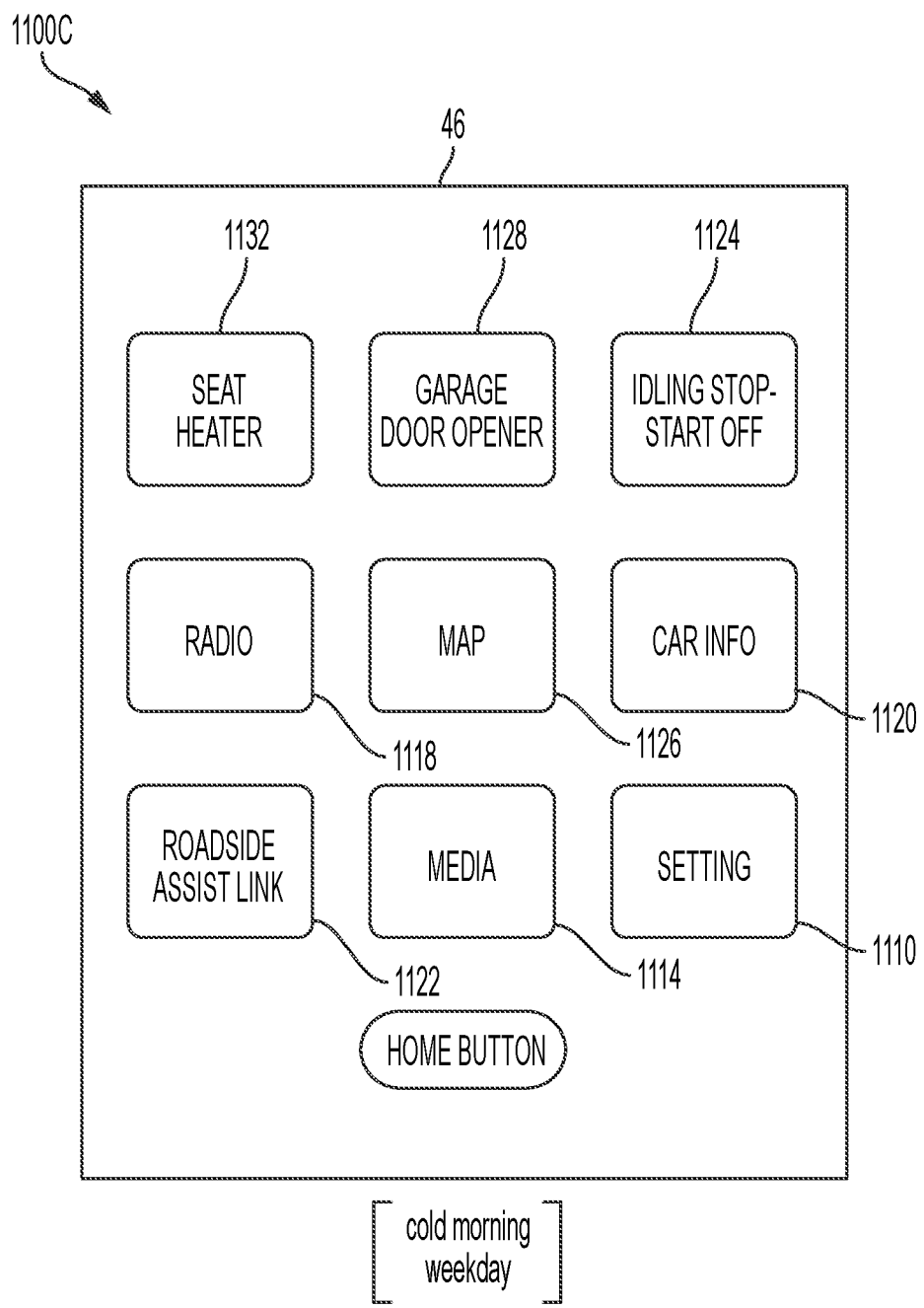

FIG. 11C illustrates an icon arrangement 1100C in which icons are rearranged according to one or more user preferences transmitted from server 20. For example, icon arrangement 1100C may be presented to the user when the user is leaving the residence to go to work in the morning of a weekday and the outside temperature is equal to or below a predetermined temperature (e.g., 40° F.). Accordingly, in icon arrangement 1100C, the icons may be arranged according to one or more user preferences selected based on the request including the location of vehicle as "home," the time and date as "Monday, May 10, 2021, 07:50 AM," and the outside temperature as "38° F." Based on the location of vehicle being "home," the time and date being "Monday, May 10, 2021, 07:50 AM," and the outside temperature being "38° F.," one or more user preferences returned from server 20 may be associated with "seat heater," "idling stop-start off," "garage opener," "radio," and "weather application" which all have "Morning" in the "Part of the Day" category, "Weekdays" in the "Weekdays/Weekend" category, and the temperature equal to or below the predetermined temperature (e.g., 40° F.) in the "temperature" category.

Vehicle HMI 12 rearranges the icons to be displayed on touchscreen 40 to reflect the returned one or more user preferences such that the top row of icon arrangement 1100C includes a seat heater icon 1132, garage door opener icon 1128, idling stop-start off icon 1124; the middle row of icon arrangement 1100C includes radio icon 1118, map icon 1126, and car information icon 1120; and the bottom row of icon arrangement 1100C includes roadside assist link icon 1122, media icon 1114, and setting icon 1110.

The top row of icon arrangement 1100C includes the icons with which the returned one or more user preferences are associated: seat heater icon 1132; garage door opener icon 1128; and idling stop-start off icon 1124. For example, during the weekdays, when the user is leaving for work from the residence and when the outside temperature is 40° F. and below, the user tends to turn on the seat heater. Accordingly, in addition to displaying the icons (i.e., garage door opener icon 1128, idling stop-start off icon 1124, radio icon 1118, etc.) that are normally associated with the user preferences for the weekday mornings, seat heater icon 1132 may be displayed on the top row of touchscreen 40. Accordingly, arranging the icons that are frequently used on a cold morning of a weekday on the top row provides the user with convenience and reduces the user's burden of taking multiple steps to even reach to the icons.

Figure 11D:
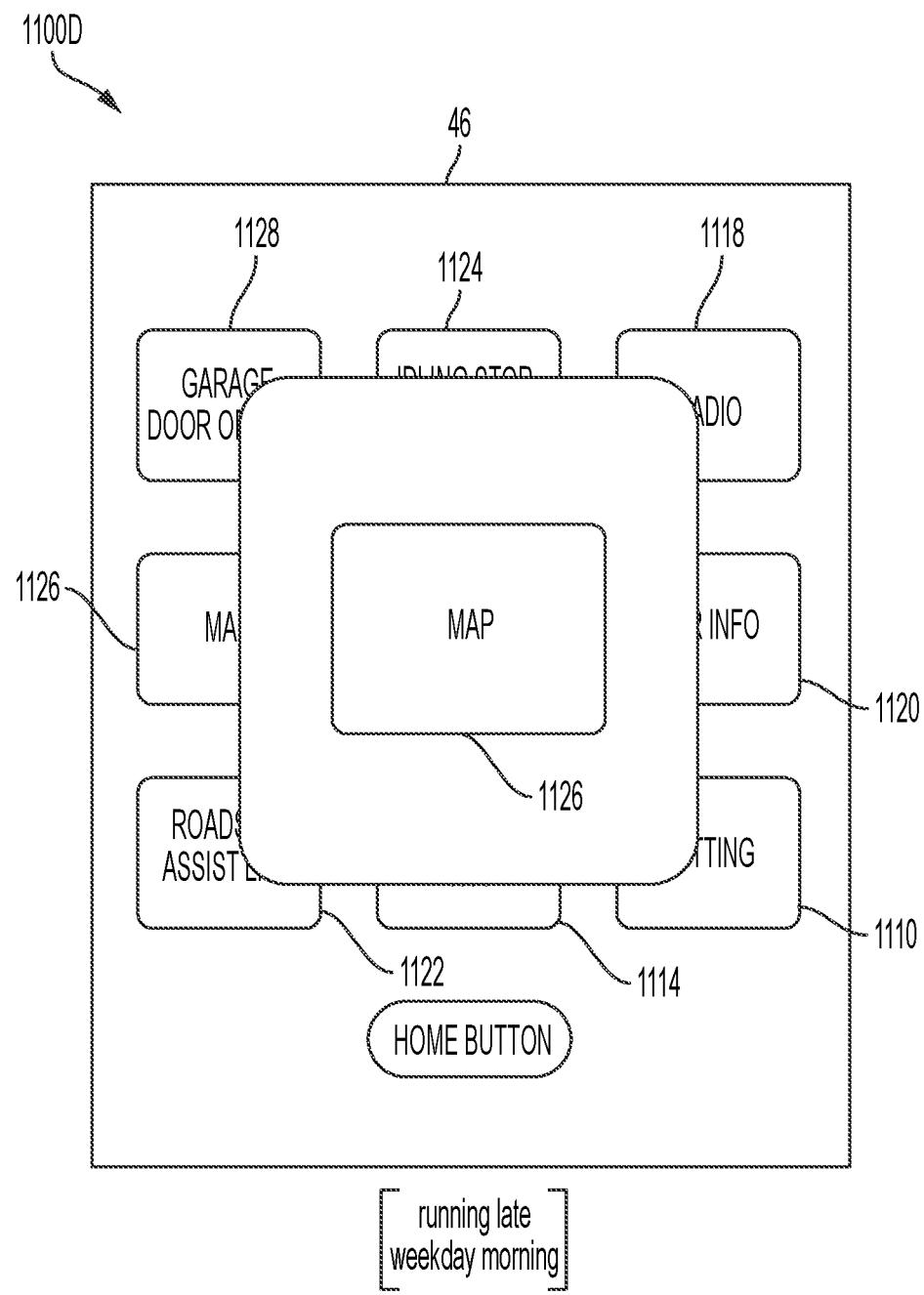

FIG. 11D illustrates an icon arrangement 1100D in which icons are rearranged according to one or more user preferences transmitted from server 20. For example, icon arrangement 1100D may be presented to the user when the user is running late to leave the residence to go to work in the morning of a weekday. Upon receiving the request including the location of vehicle as "home" and the time and date as "Monday, May 10, 2021, 08:23 AM" from vehicle HMI 12, server 20 returns one or more user preferences associated with "seat heater," "idling stop-start off," "garage opener," "radio," and "weather application" which all have "Morning" in the "Part of the Day" category and "Weekdays" in the "Weekdays/Weekend" category. In addition, the returned one or more user preferences may include instructions to display over the other displayed icons a single icon that facilitates the user to be on the road as soon as possible.

Vehicle HMI 12 rearranges the icons to be displayed on touchscreen 40 to reflect the returned one or more user preferences and the instructions so that the icons associated with the returned user preferences may be displayed on the top row along with map icon 1126 being displayed on top of the those icons. In some embodiments, map icon 1126 may be the only icon displayed on touchscreen 40. The number of icons displayed over the other icons is not limited to one, but may be two or three.

Figure 11E:
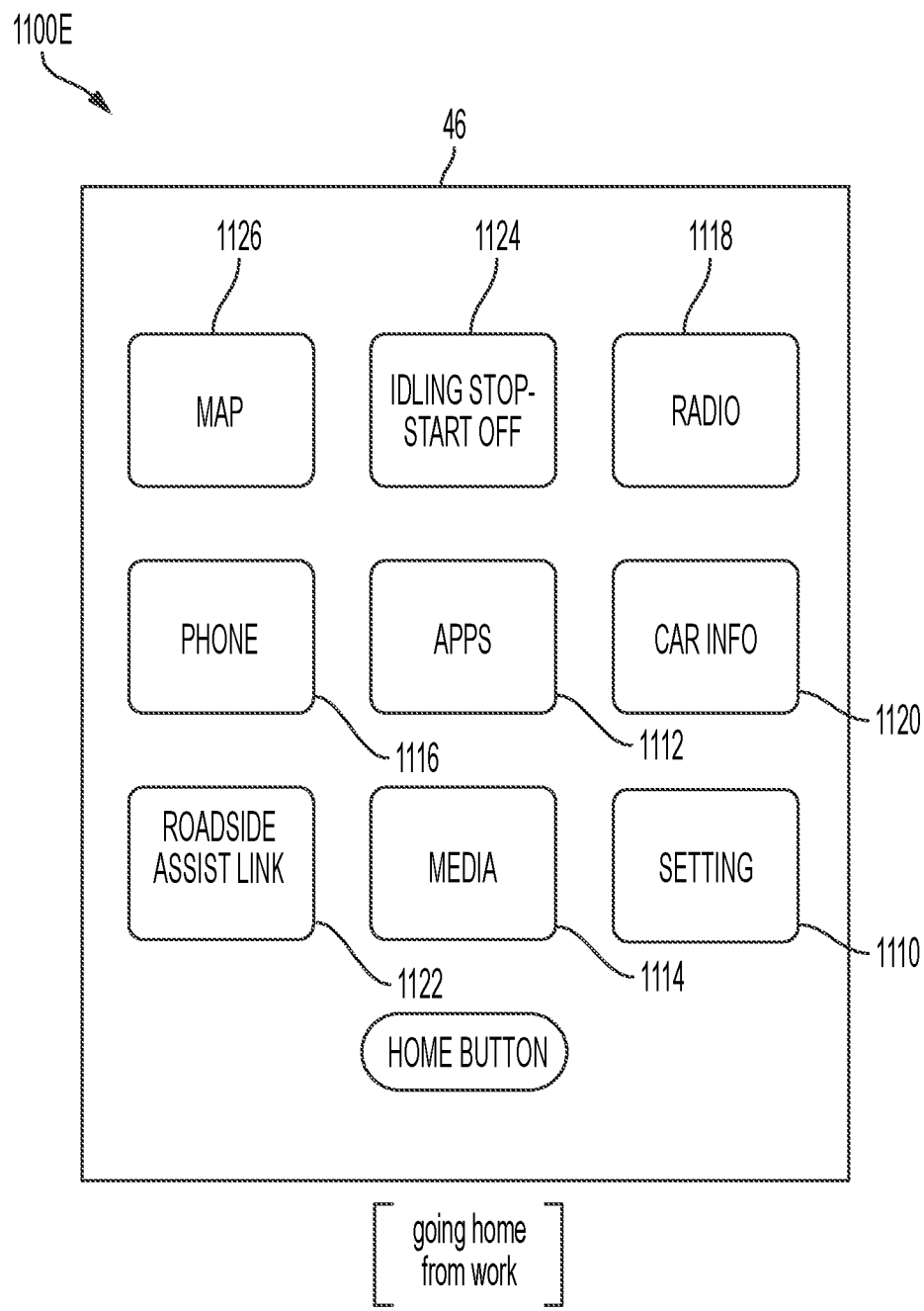
Figure 11F:
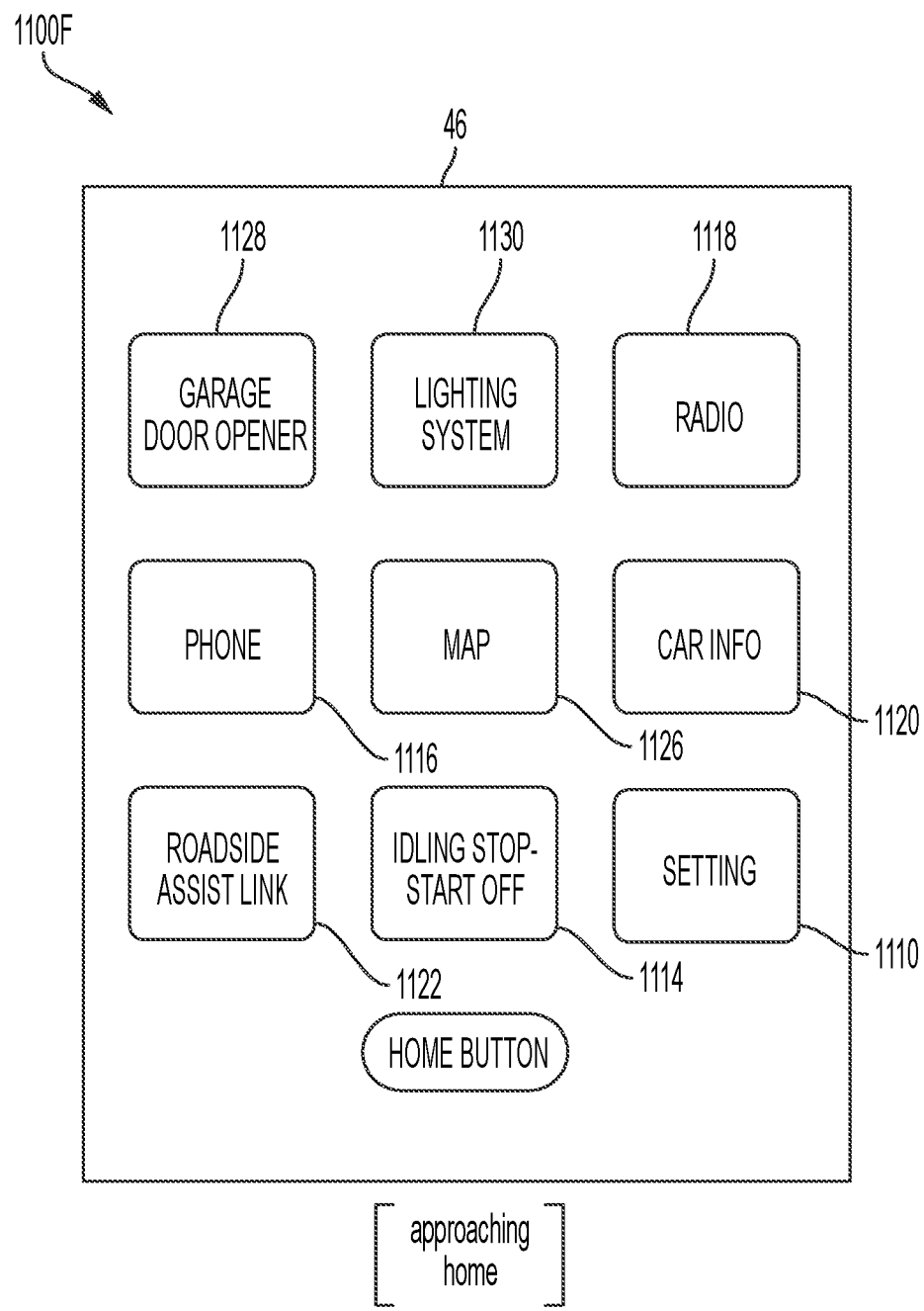

FIGS. 11E and 11F illustrate icon arrangements 1100E and 1100F, respectively, in which icons are rearranged according to one or more user preferences transmitted from server 20. For example, icon arrangement 1100E may be presented to the user when the user is leaving work to go home in the evening of a weekday, and icon arrangement 1100F may be presented to the user when the vehicle approaches the user's residence after leaving work.

In icon arrangements 1100E, the icons may be arranged according to one or more user preferences selected based on the request including the location of vehicle as "work" and the time and date as "Monday, May 10, 2021, 06:03 PM". Based on the location of vehicle being "work" and the time and date being "Monday, May 10, 2021, 06:03 PM," one or more user preferences returned from server 20 may be associated with "navigation" and "idling stop-start off" which all have "Evening" in the "Part of the Day" category and "Weekdays" in the "Weekdays/Weekend" category.

Vehicle HMI 12 rearranges the icons to be displayed on touchscreen 40 to reflect the returned one or more user preferences such that the top row of icon arrangement 1100E includes a map (navigation) icon 1126, idling stop-start off icon 1124, and radio 1118; the middle row of icon arrangement 1100E includes phone icon 1116, applications icon 1112, and car information icon 1120; and the bottom row of icon arrangement 1100E includes roadside assist link icon 1122, media icon 1114, and setting icon 1110.

The top row of icon arrangement 1100E includes the icons with which the returned one or more user preferences are associated: map (navigation) icon 1126; idling stop-start off icon 1124; and radio 1118. For example, during the weekdays, when the user is leaving work to head home, the user tends to use the navigation system and sets the destination to home to avoid heavy traffic on the way home. Additionally, the user tends to press idling stop-start off icon 1124 to turn off the idling stop-start function of the vehicle. Although the returned one or more user preferences may not be associated with "radio," vehicle HMI 12 may include radio icon 1118 on the top row of icon arrangement 1100C based on the frequency of use when the user is driving. In some embodiments, radio icon 1118 may be replaced with an icon that is arbitrary selected by vehicle HMI 12. Accordingly, arranging the icons that are frequently used in the evening of weekdays on the top row provides the user with convenience and reduces the user's burden of taking multiple steps to even reach to the icons.

In icon arrangements 1100F, the icons may be arranged according to one or more user preferences selected based on the request including the location of vehicle as "home" and the time and date as "Monday, May 10, 2021, 06:38 PM". Based on the location of vehicle being "home" and the time and date being "Monday, May 10, 2021, 06:38 PM," one or more user preferences returned from server 20 may be associated with "garage door opener" and "home lighting system" which all have "Evening" in the "Part of the Day" category and "Weekdays" in the "Weekdays/Weekend" category.

Vehicle HMI 12 rearranges the icons to be displayed on touchscreen 40 to reflect the returned one or more user preferences such that the top row of icon arrangement 1100F includes garage door opener icon 1128, a lighting system icon 1130, and radio 1118; the middle row of icon arrangement 1100F includes phone icon 1116, map icon 1126, and car information icon 1120; and the bottom row of icon arrangement 1100F includes roadside assist link icon 1122, idling stop-start off icon 1114, and setting icon 1110.

The top row of icon arrangement 1100F includes the icons with which the returned one or more user preferences are associated: garage door opener icon 1128, lighting system icon 1130, and radio 1118. For example, as the vehicle approaches closer to the residence from work, the user tends to open the garage door. Additionally, while awaiting the garage door to open, the user tends to turn the lights in the residence through smartphone (i.e., smartphone 14, smartphone 16). Accordingly, arranging the icons that are frequently used in the evening of weekdays on the top row provides the user with convenience and reduces the user's burden of taking multiple steps to even reach to the icons.

Similar to icon arrangement 1100E, although the returned one or more user preferences may not be associated with "radio", vehicle HMI 12 may include radio icon 1118 on the top row of icon arrangement 1100F based on the frequency of use when the user is driving. In some embodiments, radio icon 1118 may be replaced with an icon that is arbitrary selected by vehicle HMI 12.

As illustrated through icon arrangements 1100E and 1100F, the icon arrangements on touchscreen 40 may be adjusted while the vehicle is running based on the location information. Vehicle HMI 12 may periodically transmit the location of the vehicle to server 20, and request for user preferences based on the changes in the location. In some embodiments, server 20 may determine that the vehicle is at or within a certain distance from the residence when the home network is detected. In some other embodiments, the geolocations detected via the GPS of vehicle may be used to determine that the vehicle is at or within a certain distance from the residence.

In some embodiments, vehicle HMI 12 may be provided with all of the user preferences that are associated with a certain part of the day and a certain day of the week when the engine of the vehicle is started. As the location changes, vehicle HMI 12 may rearrange the icons on touchscreen 40 without requesting server 20 for user preferences associated with a certain location. This configuration reduces the data traffic between vehicle HMI 12 and server 20.

In some embodiments, vehicle HMI 12 may provide a feedback to server 20 regarding the icons associated with the returned one or more user preferences. The feedback includes information about whether the user interacted with the icons displayed on the top row (i.e., personalized area 1150). The feedback may also include information about whether the user re-interacted with the icons displayed on the top row. Server 20 utilizes the feedback from vehicle HMI 12 to update the user preferences to further adjusts vehicle HMI 12 to suit the usage pattern of the user.

For example, when the engine of the vehicle is started, the user is presented with idling stop-start off icon 1124 on the top row, and selects idling stop-start off icon 1124 to turn off the idling stop-start function of the vehicle. If the user re-interacts with idling stop-start off icon 1124 to turn on the idling stop-start function of the vehicle before the user turns the engine of the vehicle off, vehicle HMI 12 includes the information about the user re-interacting with idling stop-start off icon 1124. If the user does not re-interacts with idling stop-start off icon 1124 before the engine of the vehicle is turned off, vehicle HMI 12 includes the information about the user not re-interacting with idling stop-start off icon 1124.

Server 20 may determine, from the feedback, whether to keep idling stop-start off icon 1124 in the top row throughout the drive or remove idling stop-start off icon 1124 from the top row. If the user tends to not re-interact with idling stop-start off icon 1124 before the engine of the vehicle is turned off, server 20 may include, in the user preference associated with idling stop-start off icon 1124 returned to vehicle HMI 12, instructions to remove idling stop-start off icon 1124 from the top row after the user interacts with idling stop-start off icon 1124. Vehicle HMI 12 then removes the idling stop-start off icon 144 from touchscreen 40 once the user interacts with idling stop-start off icon 1124 to turn off the idling stop-start function. In some embodiments, whether to remove icons from the top row after user interacts with the icons may be set by the user instead of server 20 updating the user preferences with the feedback.

Figure 11G:
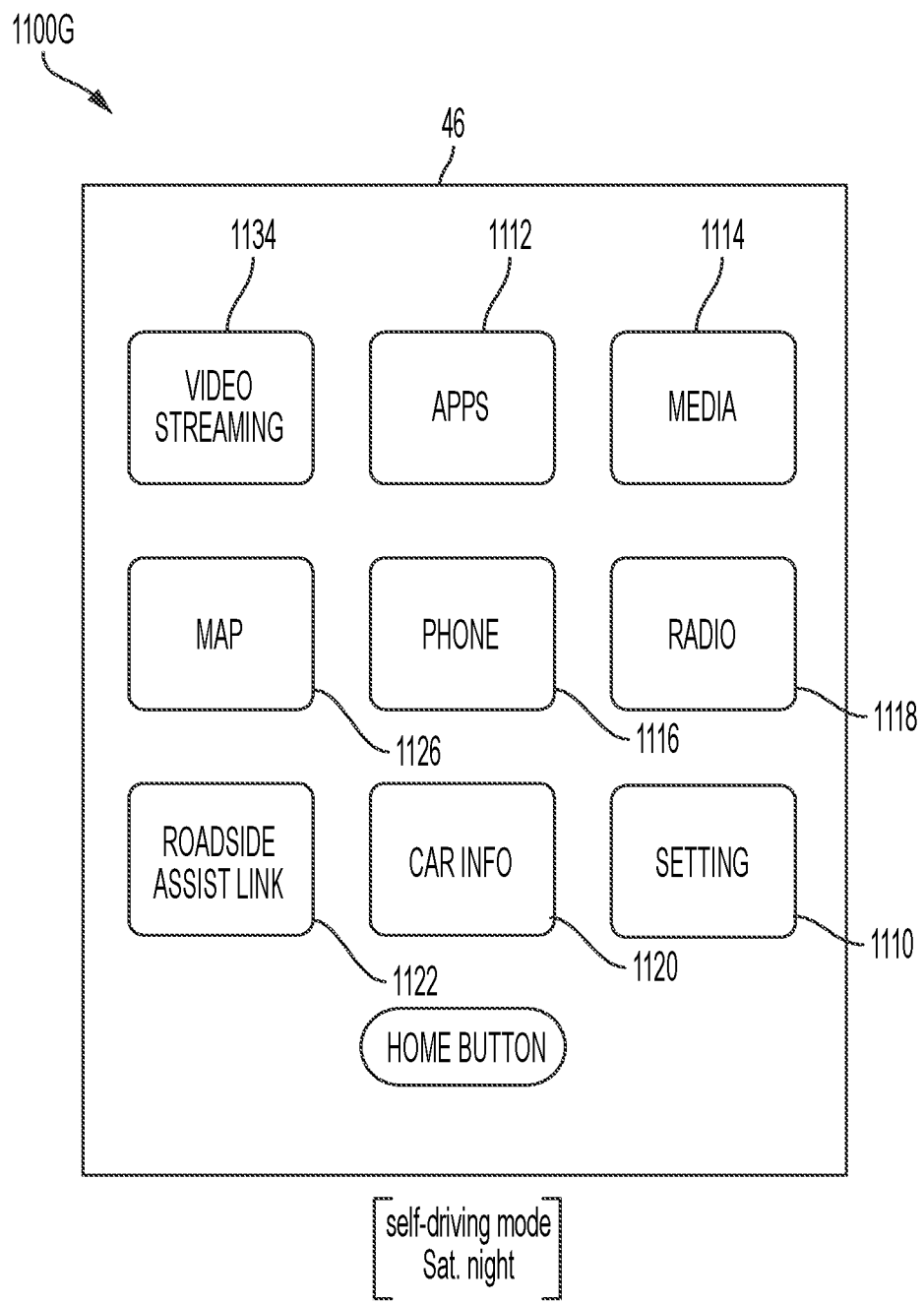

FIG. 11G illustrates an icon arrangement 1100G in which icons are rearranged according to one or more user preferences transmitted from server 20. For example, icon arrangement 1100G may be presented to the user when the user is on the way home from a night out with friends on a Saturday night. Accordingly, in icon arrangement 1100G, the icons may be arranged according to one or more user preferences selected based on the request including the location of vehicle as "restaurant" and the time and date as "Saturday, May 15, 2021, 07:38 PM".

While driving back home, the user may change the driving mode of the vehicle to a self-driving mode from a manual driving mode. Upon detecting the change in the driving mode, vehicle HMI 12 may request user preferences associated with user activities permitted while the vehicle is in the self-driving mode. Server 20 may return a user preference associated, for example, with the video streaming based on the usage pattern in the user preference area 96 that the user frequently watches a certain television show from 8:00 PM on Saturday nights. Vehicle HMI 12 rearranges the icons to be displayed on touchscreen 40 to reflect the returned the user preferences such that the top row of icon arrangement 1100G includes a video streaming icon 1134. In addition, vehicle HMI 12 may provide applications icon 1112 so that the user may select other applications and media icon 1114. Accordingly, during the self-driving mode, the user may enjoy those services that are normally available through smartphones (i.e., smartphones 14 and 16).

It is noted that if vehicle HMI 12 does not have an application for streaming videos, user preference program 46 of vehicle HMI 12 can download the application from content servers 22. Server 20 can provide vehicle HMI 12 with a link to download the application. Further, user preference program 46 of vehicle HMI 12 can share the setting with smartphone 14 so that both devices have the same application programs.

Further, when the vehicle is predicted to enter an area where data communication quality becomes poor while the user (i.e., user A) is watching the television show via vehicle HMI 12, server 20 transmits to vehicle HMI 12 instructions to display radio icon 1118 because the radio reception is not affected by the data communication quality being poor. In response to receiving the instructions, vehicle HMI 12 may automatically switch from the streaming video to radio without user A's operation. If the streaming services allow downloading the contents in advance, vehicle HMI 12 may download data in advance to avoid switching to radio in the middle of streaming video contents. Server 20 may obtain information on areas where data communication quality is poor based on communications with other vehicles or map information. A typical example of such an area is a tunnel.

These configurations of server 20 allows vehicle HMI 12 to dynamically adjust the icon arrangements to fit in the user's lifestyle and respond to any changes in the user's lifestyle.

7. Vehicle with Multiple Drivers

A single vehicle may be shared between two or more drivers. Each driver may have his or her own preferences. For example, one of the drivers enjoys listening to music while driving and utilizes the idling stop-start function of the vehicle. Another of the drivers may enjoy listening to podcasts and may not utilize the idling stop-start function of the vehicle. Server 20 stores user preferences based on the users, and thus, is able to provide user preferences to different users as long as the users register with server 20.

For example, user A drives vehicle X to a grocery store. User A having registered with server 20 has user preferences for user A stored in server 20. Thus, while driving to and from the grocery store, vehicle HMI 12 adjusts the user interface of vehicle HMI 12 according to user A's user preferences stored in server 20. When user A returns home, user B takes vehicle X to drive to meet with friends. User B having registered with server 20 also has user preferences for user B stored in server 20. Thus, while driving to meet with friends, vehicle HMI 12 adjusts the user interface of vehicle HMI 12 according to user B's user preferences stored in server 20.

Vehicle HMI 12 is able to recognize different drivers through driver recognition system 49. When vehicle HMI 12 transmits a request for user preferences, vehicle HMI 12 includes information on the recognized driver. Thus, adjusting of the user interface of vehicle HMI 12 is performed without users' active involvement.

8. New Car

Purchasing a new vehicle comes with a burdensome task of manually customizing a vehicle HMI to user's liking. If the newly purchased vehicle is equipped with vehicle HMI that communicates with server 20 and if the user is registered with server 20, the user may avoid the burdensome task of manual customization. For example, user A purchases vehicle Y in place of or in addition to vehicle X. Vehicle Y is equipped with a vehicle HMI that communicates with server 20, and the user A is registered with server 20. Accordingly, as soon as user A takes a seat in, for example, the driver seat of vehicle Y, vehicle HMI 12 recognizes user A and transmits a request for user preferences for user A to server 20. Server 20 returns one or more user preferences of user A to vehicle HMI 12. Upon receiving one or more user preferences, vehicle HMI 12 may adjusts the user interface of vehicle HMI 12 on vehicle Y such that user A can have the same driving experience as when user A drove vehicle X. Not only is user A free of the burdensome task of setting up vehicle HMI on the newly purchased vehicle, but user A is also free from learning how to manipulate the new vehicle HMI.

9. Displays for Rear Seats

In addition to touchscreen 40 for the driver, a vehicle may be equipped with touchscreens for respective passengers (i.e., passenger seat, rear seats, etc.). Vehicle HMI 12 may adjusts the touchscreens according respective passengers. For example, user A is the driver, and touchscreen 46 may be adjusted according to user A's user preferences transmitted from server 20. User B may be seated in the rear seat of the vehicle. Since user B is registered with server 20, vehicle HMI 12 is able to adjust the touchscreen (separate from touchscreen 40) equipped for the rear seats according to user B's user preferences transmitted from server 20.

10. System Configuration

To the extent that the systems discussed herein collect usage data associated with users, or may make use of the usage data, the users are provided with opportunities to control whether programs or features collect usage data (e.g., a user's preferences), and to control the user interface associated with applications based on the collected usage data. The users may also be provided with options to turn on or turn off certain features or functions provided by the systems. In some aspects, the users may elect to disable features and functions (e.g., control the user interface associated with applications based on the collected usage data) offered by the systems discussed herein. In addition, users may stipulate that certain data be treated in one or more ways before it is stored or used, so that personally identifiable information is removed. For example, a user's identity may be treated so that no personally identifiable information can be determined for the user, or a user's geographic location may be generalized where location information is obtained (such as to a city, zip code, or state level), so that a particular location of a user cannot be determined. Thus, the user has control over whether and how user information is collected, stored, and used by the disclosed systems.

Many of the above-described features and applications are implemented as software processes that are specified as a set of instructions recorded on a computer readable storage medium (also referred to as computer readable medium). When these instructions are executed by one or more processors (e.g., one or more processors, cores of processors, or other processing units), they cause the processors to perform the actions indicated in the instructions. Examples of computer readable media include, but are not limited to, magnetic media, optical media, electronic media, etc. The computer readable media does not include carrier waves and electronic signals passing wirelessly or over wired connections.

In this specification, the term "software" is meant to include, for example, firmware residing in read-only memory or other form of electronic storage, or applications that may be stored in magnetic storage, optical, solid state, etc., which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware, or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations (shown in FIGS. 2, 3, and 5) can be implemented by electronic components, for example, microprocessors, storage, and memory that store computer program instructions in a machine-readable or computer-readable medium (alternatively referred to as computer-readable storage media, machine-readable media, or machine-readable storage media). Such electronic components are implemented by circuitry including, for example, one or more semiconductor integrated circuits. Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra-density optical discs, any other optical or magnetic media, and floppy disks. The computer-readable media can store a computer program that is executable by at least one processing unit and includes sets of instructions for performing various operations. Examples of computer programs or computer code include machine code, for example, is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example, application specific integrated circuits (ASICs) or field programmable gate arrays (FPGAs). In some implementations, such integrated circuits execute instructions that are stored on the circuit itself. ASICs and FPGAs are also implemented by semiconductor integrated circuits.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

In one aspect, a method may be an operation, an instruction, or a function and vice versa. In one aspect, a clause or a claim may be amended to include some or all of the words (e.g., instructions, operations, functions, or components) recited in other one or more clauses, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software or a combination of hardware and software depends upon the particular application and design constraints imposed on the overall system. Skilled artisans may implement the described functionality in varying ways for each particular application.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It may be understood that the described instructions, operations, and systems can generally be integrated together in a single software/hardware product or packaged into multiple software/hardware products.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor may they be interpreted in such a way.

What is claimed is:

1. A method for automatically adapting a human machine interface (HMI) mounted on a vehicle to a user preference, wherein the HMI includes a touchscreen displaying selectable icons associated with functions to be performed in response to selection of the icons, and the HMI is configured to be communicable with a server, the method comprising:
   in the HMI, detecting a selection of a first icon by a user among the icons on the touchscreen;
   in the HMI, every time the first icon is selected, sending to the server, first information on a first function associated with the first icon selected, when the first icon is selected, and where the HMI is located when the first icon is selected;
   in the server, storing the first information in a storage, analyzing the first information to recognize a pattern of behavior taken by the user in selecting the first icon, generating a first user preference based on the recognized pattern, and saving the first user preference in the storage; and
   in the HMI, updating an arrangement of the icons on the touchscreen based on the first user preference from the server,
   wherein the analyzing of the first information includes determining a correlation of the first function with a certain day of a week, a certain time of that day, and a location.

2. The method according to claim 1, further comprising:
   in the server, every time second information is received from another HMI for a device owned by the user, storing in the storage the second information on a second function associated with a second icon on the another HMI, when the second function is selected, and where the another HMI is located when the second function is selected;
   in the server, analyzing the second information to recognize a pattern of behavior taken by the user in selecting the second icon, generating a second user preference based on the recognized pattern, and saving the second user preference in the storage; and
   in the HMI, updating the arrangement of the icons on the touchscreen based on the second user preference from the server,
   wherein the analyzing of the second information includes determining a correlation of the first function with a certain day of a week, a certain time of that day, and a location.

3. The method according to claim 2, further comprising:
   displaying the icons in a first area of the touchscreen based on the first user preference and the second user preference; and
   displaying icons in a second area of the touchscreen, wherein the icons in the second area are ones arranged in the touchscreen by default.

4. The method according to claim 3, further comprising, in response to a selection of one of the icons in the first area of the touchscreen, deleting the selected one of the icons from the first area of the touchscreen.

5. The method according to claim 2,
   wherein the vehicle has a manual driving mode and a self-driving mode,
   wherein the second user preference is associated with the self-driving mode, and
   wherein the second icon is displayed on the touchscreen of the HMI only when the vehicle is in the self-driving mode.

6. The method according to claim 2, further comprising:
   in the HMI, recognizing the user who is a driver of the vehicle, and associating the first information with the user;
   in the another HMI, associating the second information with the user; and
   in the server, storing the first user preference and the second user preference in association with the user, and in response to a request from an HMI of another vehicle that is owned by the user, sending the first user preference and the second user preference to the HMI of the another vehicle.

7. The method according to claim 2,
   wherein the icon includes:
      a third icon associated with a third function that is affected by data communication quality,
      a fourth icon associated with a fourth function that is not affected by the data communication quality, the fourth icon being designated to be used when the data communication quality is affected,
      a fifth icon associated with a fifth function that works with downloaded data,
   wherein the method further comprises, in response to detecting that the vehicle approaches an area where the data communication quality becomes low and based on a user preference, in the HMI, performing one of:
      displaying the fourth icon at a predetermined position on the touchscreen or switching from the third function to the fourth function, based on a user preference associated with the fourth function, and downloading data for the fifth function, and displaying the fifth icon at the predetermined position on the touchscreen or switching from the third function to the fifth function, based on a user preference associated with the fifth function.

8. The method according to claim 1,
   wherein when the server learns that the first icon associated with the first function tends to be selected when the HMI is located a certain location, the certain location that is one of parameters in the first user preference is given more weight than other parameters, and
   wherein in response to detecting that the vehicle enters an area including the certain location, the first icon is displayed in a predetermined position on the touchscreen of the HMI based on the first user preference.

9. A system for automatically adapting a human machine interface (HMI) to a user preference, wherein the HMI mounted on a vehicle includes a touchscreen displaying selectable icons associated with functions to be performed in response to selection of the icons, and the HMI is configured to be communicable with a server, the system comprising:
   first circuitry of the HMI configured to:
      detect a selection of a first icon by a user among the icons on the touchscreen;
      send to the server, first information on a first function associated with the first icon selected, when the first icon is selected, and where the HMI is located when the first icon is selected; and
   second circuitry of the server configured to store the first information from the HMI in a storage, analyze the first information to recognize a pattern of behavior taken by the user in selecting the first icon, generate a first user preference based on the recognized pattern, and save the first user preference in the storage, wherein the first circuitry of the HMI is further configured to update an arrangement of the icons in the touchscreen based on the first user preference from the server, and wherein when analyzing the first information, the second circuitry is configured to determine a correlation of the first function with a certain day of a week, a certain time of that day, and a location.

10. The system according to claim 9, further comprising: wherein the second circuitry is configured to receive from another HMI for a device owned by the user, second information on a second function associated with a second icon on the another HMI, when the second icon is selected, and where the another HMI is located when the second icon is selected, and storing the second information in the storage;

analyze the second information to recognize a pattern of behavior taken by the user in selecting the second icon, generate a second user preference based on the recognized pattern, and save the second user preference in the storage; and wherein the first circuitry of the HMI is configured to update the arrangement of the icons on the touchscreen based on the second user preference from the server, and wherein when analyzing the second information, the second circuitry is configured to determine a correlation of the second function with a certain day of a week, a certain time of that day, and a location.

11. The system according to claim 10, wherein the first circuitry of the HMI is further configured to:

display the icons in a first area of the touchscreen based on the first user preference and the second user preference; and display icons in a second area of the touchscreen, wherein the icons in the second area are ones arranged in the touchscreen by default.

12. The system according to claim 11, wherein the first circuitry of the HMI is further configured to, in response to a selection of one of the icons in the first area of the touchscreen, delete the selected one of the icons from the first area of the touchscreen.

13. The system according to claim 10, wherein the vehicle has a manual driving mode and a self-driving mode, wherein the second user preference is associated with the self-driving mode, and wherein the first circuitry of the HMI is further configured to display the second icon on the touchscreen of the HMI only when the vehicle is in the self-driving mode.

14. The system according to claim 10, further comprising:
wherein the first circuitry of the HMI is configured to associate the first information with the user,
wherein the second circuitry of the server is configured to:
store the first user preference and the second user preference in association with the user; and
in response to a request from an HMI of another vehicle that is owned by the user, send the first user preference and the second user preference to the HMI of the another vehicle, and
wherein the second information to be analyzed by the second circuitry of the server is associated with the user.

15. The system according to claim 10,
wherein the icon includes:
a third icon associated with a third function that is affected by data communication quality,
a fourth icon associated with a fourth function that is not affected by the data communication quality, the fourth icon being designated to be used when the data communication quality is affected,
a fifth icon associated with a fifth function that works with downloaded data,
wherein the first circuitry of the HMI is configured to, in response to detecting that the vehicle approaches an area where the data communication quality becomes low and based on a user preference, perform:
displaying the fourth icon at a predetermined position on the touchscreen, or switching from the third function to the fourth function, based on a user preference associated with the fourth function, or
downloading data for the fifth function, and displaying the fifth icon at the predetermined position on the touchscreen or switching from the third function to the fifth function, based on a user preference associated with the fifth function.

16. The system according to claim 9,
wherein when the second circuitry of the server learns that the first icon associated with the first function tends to be selected when the HMI is located a certain location, the second circuitry of the server is configured to gives more weight to the certain location that is one of parameters in the first user preference than other parameters, and
wherein the first circuitry of the HMI is configured to: in response to detecting that the vehicle enters an area including the certain location, display the first icon in a predetermined position on the touchscreen of the HMI based on the first user preference.

* * * * *